(12) United States Patent
Gomila et al.

(10) Patent No.: US 8,023,567 B2
(45) Date of Patent: *Sep. 20, 2011

(54) FILM GRAIN SIMULATION TECHNIQUE FOR USE IN MEDIA PLAYBACK DEVICES

(75) Inventors: Cristina Gomila, Princeton, NJ (US); Joan Llach, Princeton, NJ (US); Jeffrey Allen Cooper, Rocky Hill, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1638 days.

This patent is subject to a terminal disclaimer.

(21) Appl. No.: 11/285,540

(22) Filed: Nov. 22, 2005

(65) Prior Publication Data

US 2006/0133686 A1      Jun. 22, 2006

Related U.S. Application Data

(60) Provisional application No. 60/630,756, filed on Nov. 24, 2004.

(51) Int. Cl.
*H04N 7/12* (2006.01)
(52) U.S. Cl. .................................. 375/240.26
(58) Field of Classification Search ........... 382/254, 382/276, 284, 274–275, 100, 260–269, 305, 382/232–253; 375/240.01–240.29; 348/104, 348/441, 241, 239, 222.1, 607, 609
See application file for complete search history.

(56) References Cited

U.S. PATENT DOCUMENTS

| | | | |
|---|---|---|---|
| 4,935,816 A | 6/1990 | Faber | |
| 5,140,414 A | 8/1992 | Mowry | |
| 5,335,013 A | 8/1994 | Faber | |
| 5,374,954 A | 12/1994 | Mowry | |
| 5,406,326 A | 4/1995 | Mowry | |
| 5,471,572 A | 11/1995 | Buchner et al. | |
| 5,475,491 A | 12/1995 | Shiozawa | |
| 5,629,769 A | 5/1997 | Cookingham et al. | |
| 5,641,596 A | 6/1997 | Gray et al. | |
| 5,659,382 A | 8/1997 | Rybczynski | |
| 5,687,011 A | 11/1997 | Mowry | |
| 5,709,972 A | 1/1998 | Cookingham et al. | |
| 5,767,870 A | 6/1998 | Klassen et al. | |
| 5,831,673 A | 11/1998 | Przyborski et al. | |

(Continued)

FOREIGN PATENT DOCUMENTS

EP           0 364 285           4/1990

(Continued)

OTHER PUBLICATIONS

Office Action from U.S. Appl. No. 10/556,834 mailed Aug. 19, 2008.

(Continued)

*Primary Examiner* — Ishrat I Sherali
(74) *Attorney, Agent, or Firm* — Robert D. Shedd; Robert B. Levy

(57) ABSTRACT

Simulation of a block of film grain for addition to a block of an image occurs by first establishing at least one parameter at least in part in accordance with an attribute of the image block. At least one at least one block of film grain is simulated from at least one film grain pattern generated in accordance with the at least one parameter. In particular, the film grain pattern is generated using a bit accurate technique.

31 Claims, 3 Drawing Sheets

Film grain simulation process

U.S. PATENT DOCUMENTS

| | | | |
|---|---|---|---|
| 5,917,609 | A | 6/1999 | Breeuwer et al. |
| 6,587,509 | B1 | 7/2003 | Suzuki et al. |
| 7,065,255 | B2 | 6/2006 | Chen et al. |
| 7,738,722 | B2* | 6/2010 | Gomila et al. ............... 382/254 |
| 7,742,655 | B2* | 6/2010 | Gomila et al. ............... 382/276 |
| 2002/0034337 | A1 | 3/2002 | Shekter |
| 2003/0043922 | A1 | 3/2003 | Kalker et al. |
| 2006/0082649 | A1* | 4/2006 | Gomila et al. ............... 348/104 |
| 2006/0083316 | A1 | 4/2006 | Cooper et al. |
| 2006/0083426 | A1 | 4/2006 | Cooper et al. |
| 2006/0133686 | A1 | 6/2006 | Gomila et al. |
| 2006/0182183 | A1 | 8/2006 | Winger |
| 2006/0256853 | A1 | 11/2006 | Schlockerman et al. |
| 2006/0291557 | A1 | 12/2006 | Tourapis |
| 2007/0036452 | A1 | 2/2007 | Llach et al. |
| 2007/0047658 | A1 | 3/2007 | Tourapis et al. |
| 2007/0058866 | A1 | 3/2007 | Boyce et al. |
| 2007/0058878 | A1 | 3/2007 | Gomila et al. |
| 2007/0070241 | A1* | 3/2007 | Boyce et al. ............... 348/441 |
| 2007/0104380 | A1 | 5/2007 | Gomila et al. |
| 2007/0117291 | A1 | 5/2007 | Cooper et al. |
| 2007/0297515 | A1 | 12/2007 | Gomila et al. |

FOREIGN PATENT DOCUMENTS

| | | |
|---|---|---|
| EP | 1175091 | 1/2002 |
| EP | 1215624 | 6/2002 |
| GB | 2312124 | 10/1997 |
| JP | 04097681 | 8/1990 |
| JP | 08079765 | 3/1996 |
| WO | WO93/14591 | 7/1993 |
| WO | WO95/20292 | 7/1995 |
| WO | WO97/10676 | 3/1997 |
| WO | WO 97/22204 | 6/1997 |
| WO | WO 00/18109 | 3/2000 |
| WO | WO00/28345 | 5/2000 |
| WO | WO2005/027045 | 3/2005 |
| WO | WO2006/057703 | 6/2006 |

OTHER PUBLICATIONS

Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.
Cristina Gomila, "SEI message for film grain encoding: syntax and results" Document JVT-1013r2, Sep. 2, 2003, pp. 1-11, XP002308743 pp. 2-5, paragraph 3.
Cristina Gomila et al, "SEI message for film grain encoding" May 23, 2003, pp. 1-14, XP002308742 p. 3, paragraphs "Film grain simulation (decoder)" Document JVT-H022 p. 3, paragraph 3.1 p. 6, paragraph 4.2 figures 1,2.
Schlockermann M et al: "Film grain coding in H.264/AVC" JVT-1034d2, Sep. 2, 2003, pp. 1-8, XP002311238 pp. 1-2, paragraph 2.1-2.2 figures 1,2.
Al Shaykh et al: "Lossy Compression of Images Corrupted by Film Grain Noise", School of Electrical and Computer Engineering, 1996 IEEE.
Al Shaykh et al: "Restoration of Lossy Compressed Noisy Images," IEEE Transactions on Image Processing, vol. 8, No. 10. Oct. 1999.
Al Shaykh et al: "Lossy Compression of Noisy Images." IEEE Transactions on Image Processing, vol. 7, No. 12, Dec. 1998.
Chavel et al: "Film Grain Noise in Partially Coherent Imaging," Optical Engineering, vol. 19, No. 3, May-Jun. 1980.
Campisi et al: "Signal-Dependent Film Grain Noise Generation Using Homomorphic Adaptive Filtering," IEE Proceedings, Image Signal Process, vol. 147, No. 3, Jun. 2000.
Fischer et al: "Image Sharpening Using Permutation Weighted Medians," Department of Electrical Engineering, University of Delaware, fischer@ee.udel.edu.
Illingworth et al: "Vision, Image and Signal Processing," The Institution of Electrical Engineers, IEE Proceedings, Jun. 2000, vol. 147, No. 3.
Conklin et al: "Dithering 5-Tap Filter for Inloop Deblocking, JVT of ISO/IEC MPEG & ITU-T VCEG", $3^{rd}$ Meeting, Fairfax, Virginia, May 6-10, 2002. pp. 1-16.
McLean et al: "Telecine Noise Reduction," CP-002285972, 2001. The Institute of Electrical Engineers.
Oktem et al: "Transform Domain Algorithm for Reducing Effect of Film-Grain Noise in Image Compression, " Electronics Letters, Oct. 14, 1999. vol. 35, No. 21.
Peng et al, "Adaptive Frequency Weighting for Fine Granularity-Scalability," Visual Communications and Image Processing and Image Processing 2002, Proceeding of SPIE, vol. 4671, 2002 SPIE0277-786X/02.
Prades-Nebot et al, "Rate Control for Fully Fine-Grained Scalabel Video Coders, "Visual Communications and Image Processing 2002, Proceeding of SPIE, vol. 4671 (2002) , SPIE 0277-786X/02.
Schaar et al, "Fine Granularity Scalability for Wireless Video and Scalable Storage," Visual Communications and Image Processing 2002, Proceedings of SPIE, vol. 4671 (2002) SPIE 0277-786X/02.
Shahnaz et al, "Image Compression in Signal-Dependent Noise," Applied Optice, vol. 38, No. 26, Sep. 10, 1999.
Yoshida, "Go with the Grain, Film R & D Chief Urges, for Art's Sake, " EE Times, Feb. 7, 2005.
Yan, Jacky Chun Kit et al, "Film Grain Noise Removal and Generation for Color Images", Dept. Electrical and Computer Engineering, University of Toronto, Toronto, Ontario, Canada, IEEE 1998, pp. 2957-2960.
Yan et al, "Efficient Video Coding with Hybrid Spatial and Fine-Grain SNR Capabilities, " Department of Electronic Engineering, Beijing Institute of Technology, China.
Yan et al, "Signal-Dependent Film Grain Noise Removal and Generation Based on Higher-Order Statistics," University of Toronto, Department of Electricaland Computer Engineering, 1997 IEEE.
Zhao et al: "Constant Quality Rate Control for Streaming MPEG-4 FGS Video," Univ. of Southern California, Integrated Media Systems Center & Dept. of Electrical Engineering, 2002, IEEE, pp. 544-547.

* cited by examiner

FGM processing chain

Film grain simulation process

FILM GRAIN SIMULATION TECHNIQUE FOR USE IN MEDIA PLAYBACK DEVICES

CROSS-REFERENCE TO RELATED APPLICATIONS

This application claims priority under 35 U.S.C. 119(e) to U.S. Provisional Patent Application Ser. No. 60/630,756 filed Nov. 24, 2004, the teachings of which are incorporated herein.

TECHNICAL FIELD

This invention relates to a technique for simulating film grain in an image, and more particularly for simulating film grain in an image for playback by a media device.

BACKGROUND OF THE INVENTION

Motion picture films comprise silver-halide crystals dispersed in an emulsion, coated in thin layers on a film base. The exposure and development of these crystals form the photographic image consisting of discrete tiny particles of silver. In color negatives, the silver undergoes chemical removal after development and tiny blobs of dye occur on the sites where the silver crystals form. These small specks of dye are commonly called 'grain' in color film. Grain appears randomly distributed on the resulting image because of the random formation of silver crystals on the original emulsion. Within a uniformly exposed area, some crystals develop after exposure while others do not.

Grain varies in size and shape. The faster the film, the larger the clumps of silver formed and blobs of dye generated, and the more they tend to group together in random patterns. The grain pattern is typically known as 'granularity'. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable on cinema and high-definition images, whereas film grain progressively loses importance in SDTV and becomes imperceptible in smaller formats.

Motion picture film typically contains image-dependent noise resulting either from the physical process of exposure and development of the photographic film or from the. subsequent editing of the images. The photographic film possesses a characteristic quasi-random pattern, or texture, resulting from physical granularity of the photographic emulsion. Alternatively, a similar pattern can be simulated over computed-generated images in order to blend them with photographic film. In both cases, this image-dependent noise is referred to as grain. Quite often, moderate grain texture presents a desirable feature in motion pictures. In some instances, the film grain provides visual cues that facilitate the correct perception of two-dimensional pictures. Film grain is often varied within a single film to provide various clues as to time reference, point of view, etc. Many other technical and artistic uses exist for controlling grain texture in the motion picture industry. Therefore, preserving the grainy appearance of images throughout image processing and delivery chain has become a requirement in the motion picture industry.

Several commercially available products have the capability, of simulating film grain often for blending a computer-generated object into a natural scene. Cineon® from Eastman Kodak Co, Rochester N.Y., one of the first digital film applications to implement grain simulation, produces very realistic results for many grain types. However, the Cineon® application does not yield good performance for many high-speed films because of the noticeable diagonal stripes the application produces for high grain size settings. Further, the Cineon® application fails to simulate grain with adequate fidelity when images are subject to previous processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

None of these past schemes solves the problem of restoring film grain in compressed video. Film grain constitutes a high frequency quasi-random phenomenon that typically cannot undergo compression using conventional spatial and temporal methods that take advantage of redundancies in the video sequences. Attempts to process film-originated mages using MPEG-2 or ITU-T/ISO H.264 compression techniques usually result either in an unacceptably low degree of compression or complete loss of the grain texture.

Thus, there exists a need for a technique simulating film grain in an image for playback by a media player.

BRIEF SUMMARY OF THE INVENTION

Briefly, in accordance with the present principles, there is provided a method for simulating a film grain block for addition to a block of an image to assure bit accuracy during image playback at normal and trick play modes. The method commences by establishing at least one parameter at least in part in accordance with an attribute of the block. Thereafter, at least one block of film grain is established with bit accuracy in accordance with the at least one parameter.

DETAILED DESCRIPTION

Figure 1:
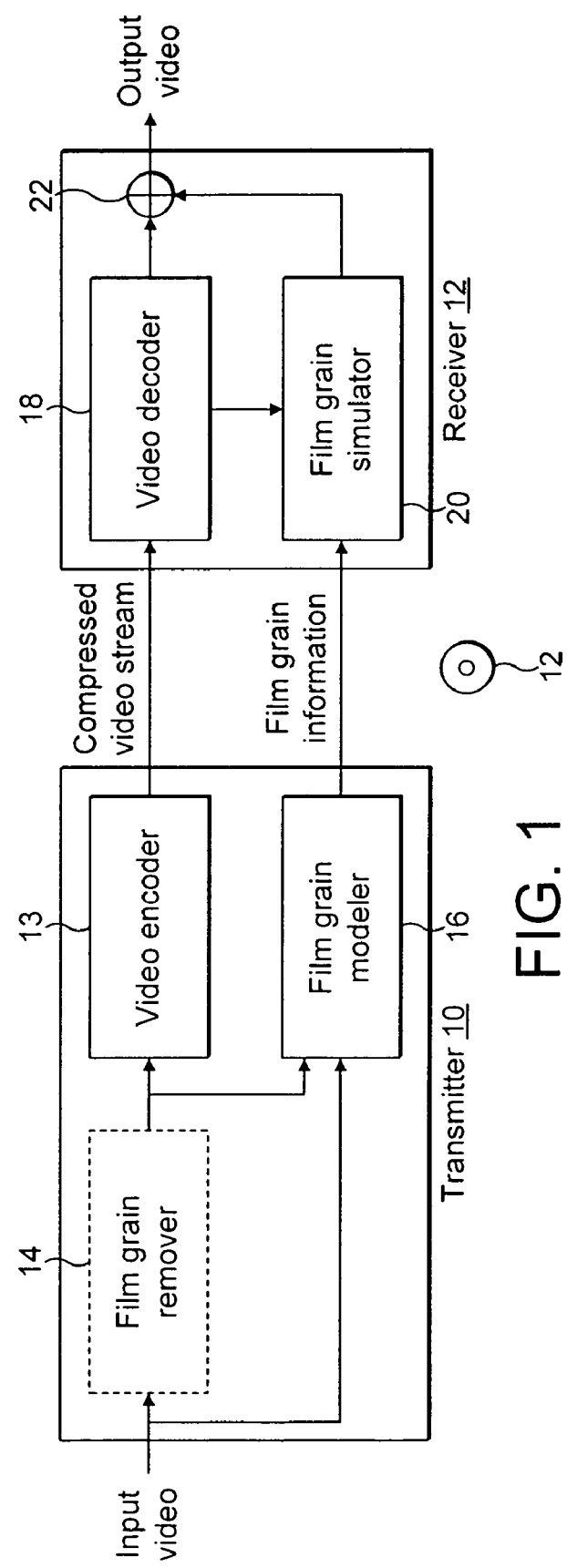
FIG. 1 depicts a block schematic diagram of the combination of a transmitter and receiver in a film grain processing chain useful for practicing the technique of the present principles.

To understand the technique of the present principles for simulating a bit-accurate film grain pattern comprised of individual film grain blocks, a brief overview of film grain simulation will prove helpful. FIG. 1 depicts a block schematic diagram of a transmitter 10, which receives an input video signal and, in turn, generates a compressed video stream at its output. In addition, the transmitter 10 also generates information indicative of the film grain (if any) present in the sample. In practice, the transmitter 10 could comprise part of a head-end array of a cable television system, or other such system that distributes compressed video to one or more downstream receivers 11, only one of which is shown in FIG. 1. The transmitter 10 could also take the form of encoder that presents media like a DVD 12. The receiver 11 decodes the coded video stream and simulates film grain in accordance with the film grain information and decoded video, both received from the transmitter 10 or directly from the media itself in the case of a DVD or the like, to yield an output video stream that has simulated film grain. The receiver 11 can take the form of a set-top box or other such mechanism that serves to decode compressed video and simulate film grain in that video. In particular, the receiver 11 could take the form of a DVD reproduction device capable of decoding an image for playback, blending film grain in such image, and playing back the image at normal and trick play speeds.

The overall management of film grain requires the transmitter 10 (i.e., the encoder) provide information with respect to the film grain in the incoming video. In other words, the transmitter 10 "models" the film grain. Further the receiver 11 (i.e., the decoder) simulates the film grain according to the film grain information received from the transmitter 10. The transmitter 10 enhances the quality of the compressed video by enabling the receiver 11 to simulate film grain in the video signal when difficulty exists in retaining the film grain during the video coding process.

In the illustrated embodiment of FIG. 1, the transmitter 10 includes a video encoder 13 which encodes the video stream using any of the well known video compression techniques such as the ITU-T Rec. H.264 | ISO/IEC 14496-10 video compression standard. Optionally, a film grain remover 14, in the form of a filter or the like depicted in dashed lines in FIG. 1, could exist upstream of the encoder 13 to remove any film grain in the incoming video stream prior to encoding. To the extent that the incoming video contains no film grain, no need would exist for the film grain remover 14.

A film grain modeler 16 accepts the input video stream, as well as the output signal of the film grain remover 14 (when present). Using such input information, the film grain modeler 16 establishes the film grain in the incoming video signal. In its simplest form, the film grain modeler 16 could comprise a look up table containing film grain models for different film stocks. Information in the incoming video signal would specify the particular film stock originally used to record the image prior to conversion into a video signal, thus allowing the film grain modeler 16 to select the appropriate film grain model for such film stock. Alternatively, the film grain modeler 16 could comprise a processor or dedicated logic circuit that would execute one or more algorithms to sample the incoming video and determine the film grain pattern that is present, as discussed hereinafter.

The receiver 11 typically includes a video decoder 18 that serves to decode the compressed video stream received from the transmitter 10. The structure of the decoder 18 will depend on the type of compression performed by the encoder 13 within the transmitter 10. Thus, for example, the use within the transmitter 10 of an encoder 13 that employs the ITU-T Rec. H.264 | ISO/IEC 14496-10 video compression standard to compress outgoing video will dictate the need for an H.264-compliant decoder 18. Within the receiver 11, a film grain simulator 20 receives the film grain information from the film grain modeler 16. The film grain simulator 20 can take the form of a programmed processor, or dedicated logic circuit having the capability of simulating film grain for combination via a combiner 22 with the decoded video stream.

Film grain simulation aims to synthesize film grain samples that simulate the look of the original film content. As described, film grain modeling occurs at the transmitter 10 of FIG. 1, whereas film grain simulation occurs at the receiver 11. In particular, film grain simulation occurs in the receiver 11, along with the decoding of the incoming video stream from the transmitter 10 upstream of the video decoder. Note that the decoding process that occurs in the receiver 11 makes no use of images with added film grain. Rather, film grain simulation constitutes a post-processing method for synthesizing simulated film grain in the decoded images for display. For that reason, the ITU-T Rec. H.264 | ISO/IEC 14496-10 video compression standard contains no specifications regarding the film grain simulation process. However, film grain simulation requires information concerning the grain pattern in the incoming video signal, which information typically undergoes transmission in a Supplemental Enhancement Information (SEI) message when using the ITU-T Rec. H.264 | ISO/IEC 14496-10 video compression standard as specified by the Amendment 1 (Fidelity Range Extensions) of that compression standard.

The film grain simulation technique of the present principles enables bit-accurate film grain simulation and has applications to consumer products, such as HD DVD players for example. Other potential applications could include set top boxes, television sets, and even recording devices such as camcorders and the like. The simulation technique specifications comply with the ITU-T Rec. H.264 | ISO/IEC 14496-10 standard. Film grain simulation occurs after decoding the video bit-stream and prior to pixel display. The film grain simulation process requires the decoding of film grain supplemental information, eventually transmitted in a film grain characteristics SEI message as specified by the Amendment 1 (Fidelity Range Extensions) of the ITU-T Rec. H.264 | ISO/IEC 14496-10 standard [1]. Specifications affecting the film grain characteristics SEI message are provided to ensure the technology will meet the requirements of high definition systems in terms of quality and complexity.

Film Grain Characteristics SEI Message Specifications

As discussed, film grain characteristics appear in the ITU-T Rec. H.264 | ISO/IEC 14496-10 film grain characteristic SEI message that accompanies the image. The values of the parameters in the film grain characteristic message are constrained as follows:

model_id specifies the simulation model. In the illustrated embodiment, the value equals 0, which identifies the film grain simulation model as frequency filtering.

separate_colour_description_present_flag specifies whether the color space in which the film grain parameters are estimated is different from the color space in which the video sequence has been encoded. In the illustrated embodiment, the value equals 0, which indicates that the color space for film grain simulation remains the same as for encoding.

blending_mode_id specifies the blending mode used to blend the simulated film grain with the decoded pictures. In the illustrated embodiment, the value equals 0, which corresponds to the additive blending mode.

log2_scale_factor specifies the logarithmic scale factor used to represent the film grain parameters in the SEI message. In the illustrated embodiment, the value lies in the range [2, 7] to ensure the film grain simulation can occur using 16-bit arithmetic.

intensity_interval_lower_bound[c][i] and intensity_interval_upper_bound[c][i] specify the limits of the intensity interval i of color component c for which film grain parameters have been modeled. For all c and for any intensity value v, there will be a single intensity interval i that verifies intensity_interval_lower_bound[c][i]<=v and intensity_interval_upper_bound[c][i]>=v, since multi-generational film grain is not allowed.

num_model_values_minus1[c] specifies the number of model values present in each intensity interval for color component c. For all c, the value lies in the range [0, 2], which specifies that band-pass filtering and cross-color correlation are not supported.

comp_model_value[c][i][0] specifies the film grain intensity for color component c and intensity interval i. For all c and i, the value lies in the range [0, 255] to ensure film grain simulation can occur using 16-bit arithmetic.

comp_model_value[c][i][1] specifies the horizontal high cut frequency that characterizes the film, grain shape for color component c and intensity interval i. For all c and i, the value lies in the range [2, 14], which includes all the required grain patterns.

comp_model_value[c][i][2] specifies the vertical high cut frequency that characterizes a film grain shape for color component c and intensity interval i. For all c and i, the value lies in the range [2, 14] which includes all the required grain patterns.

film_grain_characteristics_repetition_period indicates whether another film grain characteristics SEI message shall be present in the bitstream and specifies the picture order count interval which another film grain characteristics SEI message will be present. In the illustrated embodiment, the value equals equal to 0 to specify that the film grain characteristics SEI message applies to the current decoded picture only.

In accordance with the present principles, a film grain characteristics SEI message must precede all pictures requiring the insertion of film grain. This approach ensures bit accuracy in trick mode play as well as regular play mode for media reproduction devices such as DVD players and the like, and allows bit-accurate film grain insertion in both decode order and display order, provided the film grain simulation occurs using bit-accurate techniques.

Combining all the color components c and intensity intervals in an SEI message, the number of different pairs (comp_model_value[c][i][1], comp_model_value [c][i][2]) cannot exceed ten. All the other parameters in the film grain characteristics SEI message specified by the ITU-T Rec. H.264 | ISO/IEC 14496-10 standard have no constraints according to the present principles.

Bit-Accurate Film Grain Simulation

Film grain simulation occurs in the current picture unless the parameter film_grain_characteristics_cancel_flag is 1. The current ITU-T Rec. H.264 | ISO/IEC 14496-10 video compression-standard specifications allow the simulation of film grain in all color components. Film grain simulation and addition of the simulated film grain to the color component c of the decoded picture occurs if comp_model_present_flag[c] equals 1 in the film grain characteristics SEI message. In accordance with the present principles, bit-accurate film grain simulation occurs by first specifying a database of film grain patterns. Thereafter, pseudo-random selection of a film grain pattern occurs using a uniform pseudo-random number generator for this purpose. The selected pattern then undergoes a precise sequence of operations. Film grain simulation typically occurs independently for each color component.

Film Grain Simulation Operational Sequence

Figure 2:
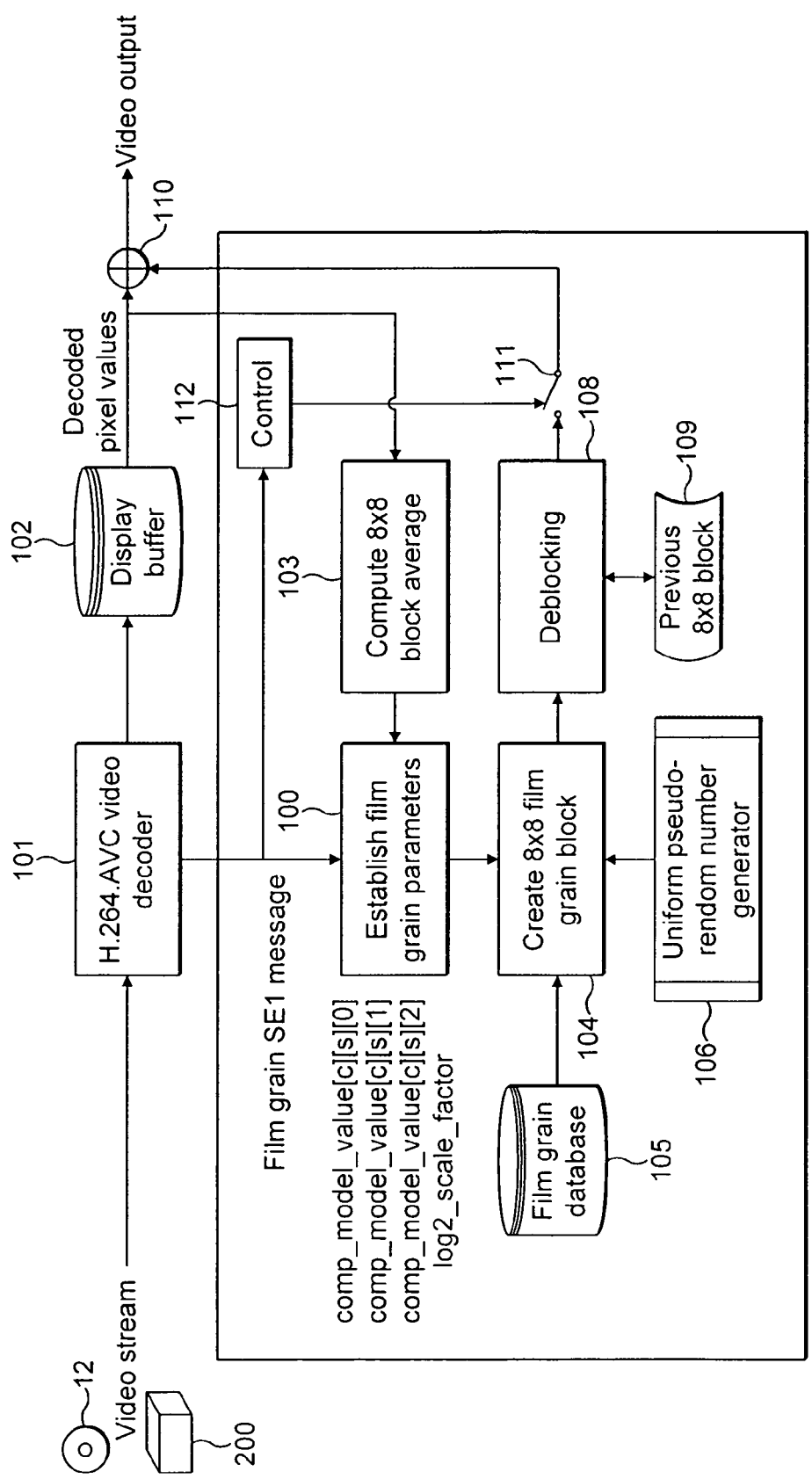
FIG. 2 depicts a block schematic diagram of a system for simulating film grain in accordance with the present principles.

The sequence of operations performed to simulate and add film grain to a decoded picture appears in FIG. 2. Particularization of the simulation process to a specific one of a triad of primary colors occurs by setting c equal to 0, 1 or 2. In the illustrative embodiment film grain simulation occurs in raster scan order, with a block size of 8×8 pixels, but other implementations remain possible.

The sequence of operations begins with the execution of step 100 to establish the film grain parameters. Part of the process of establishing the film grain parameters for the simulated film grain includes extracting film grain information carried by the incoming video signal that originated upon reproduction of the DVD 12, or that originates from a set top box 200. With the incoming video signal encoded using the ITU-T Rec. H.264 | ISO/IEC 14496-10 video coding standard, film grain information will appear in the SEI message. Extracting the SEI message requires decoding of the incoming H.264 coded incoming video signal using a H.264 | MPEG-4 AVC-compliant decoder 101 as shown in FIG. 2. In practice, the decoder 101 would exist within the set top box 200 or within the DVD player for reproducing the information on the DVD 12.

The SEI message contains several parameters, including intensity_interval_lower_bound[c][i] and intensity_interval_upper_bound[c][i] where i ranges from 0 to the value of the parameter num_intensity_intervals_minus1[c]. These SEI message parameters undergo a comparison against the average pixel intensity value computed for a color component c of each non-overlapping 8×8 pixel block in the decoded image stored in a display buffer 102 following decoding by the decoder 101. For each non-overlapping 8×8 pixel block from color component c of the decoded image, computation of the average value occurs during step 103 in the following manner:

```
avg = 0
for( k = 0; k<8; k++ )
  for( l = 0; l<8; l++ )
    avg += decoded_picture[ c ][ m + k ][ n + l ]
avg = (avg + 32) >> 6
``` where (m,n) are the top-left coordinates of the block and decoded_picture[c][m+k][n+l] is the decoded pixel value at coordinates (m+k, n+l) of color component c.

The average value is compared to the SEI message intensity_interval_lower_bound[c][i] and intensity_interval_upper_bound[c][i] parameters, for values of i ranging from 0 to num_intensity_intervals_minus1[c]. The value of i for which the block average value is larger or equal than intensity_interval_lower_bound[c][i ] and smaller or equal than intensity_interval_upper_bound[c][i], denoted by s, serves to select the film grain parameters for the current block established during step 100. If no value exists that fulfills the previous condition, no film grain simulation occurs on the current block. In such case, the film grain block creation process that would otherwise occur during step 104, as described hereinafter, does not occur. Under such conditions, the deblocking step 108, as described hereinafter, receives as an input an 8×8 block with all its pixels equal to zero.

In the illustrative embodiment, the SEI message contains horizontal high and vertical high cut frequencies (some times referred to as cut-off frequencies) that describe the properties of a two-dimensional filter that characterizes the desired film grain pattern). The cut frequencies of the chroma components (c=1, 2) set forth in the SEI message, when set forth in a 4:4:4 chroma format, undergo scaling to adapt to the 4:2:0 chroma format as follows:

comp_model_value[c][S][1]=Clip(2, 14, (comp_model_value[c][s][1]<<1))
comp_model_value[c][s][2]=Clip(2, 14, (comp_model_value[c][s][2]<<1))

Step 104 initiates the process of establishing a film grain block, typically although not necessarily 8×8 pixels in size. The step of establishing a film grain block of 8×8 pixels involves retrieving a block of 8×8 film grain samples from a film grain database 105, and scaling the samples to the proper intensity. Scaling, while desirable need not necessarily occur. The database 105 typically comprises 169 patterns of 4,096 film grain samples, each representing a 64×64 film grain pattern. The database 105 stores the values in 2's complement form, ranging from −127 to 127. Synthesis of each film grain pattern typically occurs using a specific pair of cut frequencies that establish a two-dimensional filter that defines the film grain pattern. The cut frequencies transmitted in the SEI message enable access of the database 105 of film grain patterns during film grain simulation.

Figure 3:
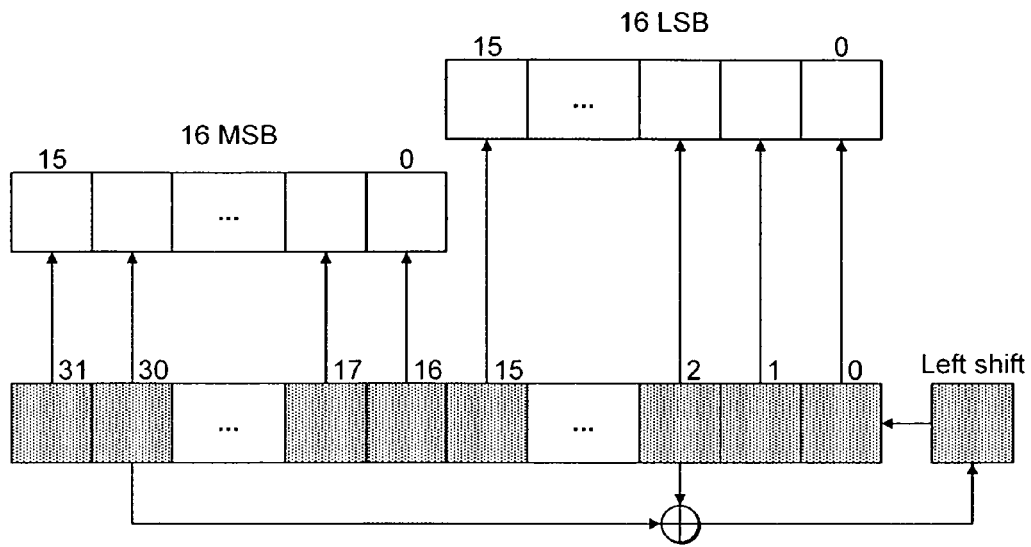
FIG. 3 depicts a block diagram of a shift register for generating a primitive polynomial modulo 2 for simulating film grain in accordance with the method of FIG. 2.

The creation of a film grain block of 8×8 pixels not only involve the retrieval of a block of 8×8 film grain samples from the database, but the scaling of those samples to the proper intensity. The cut frequencies comp_model_value[c][s][1] and comp_model_value[c][s][2] determine which pattern of the database is used as source of film grain samples and two randomly generated values select an 8×8 block from it. These random values represent a horizontal and vertical offset within the 64×64 pixel pattern and are created using the following procedure:

```
k_offset = (MSB₁₆(x(r, e_c)) % 52)
k_offset &= 0xFFFC
k_offset += m & 0x0008
l_offset = (LSB₁₆(x(r, e_c)) % 56)
l_offset &= 0xFFF8
l_offset += n & 0x0008
``` where $x(r, e_c)$ indicates the r-th symbol of the sequence x of pseudo-random numbers, generated by a random number generator 114 depicted in FIG. 3, when the random number generator is initialized with the seed $e_c$. As seen in FIG. 3, the random number generator 114 comprises a 32 bit shift register whose most significant sixteen bits and least significant sixteen bits constitute the values $MSB_{16}$ and $LSB_{16}$, appearing above. (m,n) are the coordinates of the current 8×8 block in the decoded picture. For the k_offset, the first equation generates a pseudo-random value uniformly distributed in the range [0,51], the second equation restricts that value to multiples of 4, and the last equation adds 8 to k_offset when m % 16 equals 8. Equivalent operations are performed for the l_offset.

In practice, the pseudo-random number generator 114 of FIG. 3 makes use of a primitive polynomial modulo 2 operator, $x^{31}+x^3+1$ in connection with a 32-bit shift register, to randomly select film grain blocks of 8×8 pixels from the film grain patterns of 64×64 pixels stored in the database 105. In the illustrated embodiment, initialization of the seed of the pseudo-random number generator 114 occurs according to the following equation:

$$e_c = \text{Seed\_LUT}[(\text{ABS}(\text{POC}) + \text{idr\_pic\_id} \ll 5 + \text{offset}[c]) \% 173]$$

where
ABS(.) denotes the absolute value;
POC is the picture order count of the current picture, which shall be derived from the video stream as specified in the ITU-T Rec. H.264 | ISO/IEC 14496-10 standard; and idr_pic_id shall be read from the slice header of an ITU-T Rec. H.264 | ISO/IEC 14496-10 video stream in order to identify IDR pictures.

To ensure proper film grain simulation, the HD DVD system specifications specify that idr_pic_id changes for each encoded IDR; whereas offset[3]={0, 58, 115} provides a different offset for each color component; and Seed_LUT appears in Annex A, sub-clause A.3. During a pause, the seeds of the pseudo-random number generator 114 undergo initialization to the same value at the beginning of the picture. Alternatively, the seed could be initialized as follows:

$$e_c = \text{Seed\_LUT}[(\text{PicOrderCnt} + \text{PicOrderCnt\_offset} \ll 5 + \text{color\_offset}[c]) \% 256]$$

where color_offset[3]={0, 85, 170} and Seed_LUT contains 256 values instead of 173.

Figure 4:
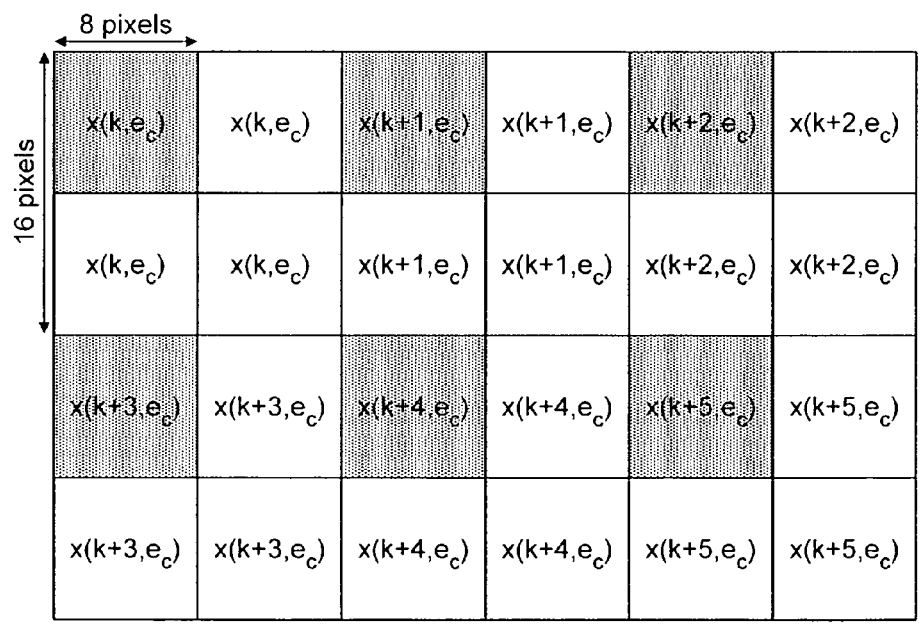
FIG. 4 depicts a pixel grid showing the use of random numbers in generating film grain in accordance with the method of FIG. 2.

The pseudo-random value $x(r, e_c)$, created via the pseudo-random number generator 114 of FIG. 3 undergoes updating every 16 pixels (horizontally) and every 16 lines (vertically). Each non-overlapping area of 16×16 pixels of the decoded picture uses the same pseudo-random number $x(r, e_c)$. As illustrated in FIG. 4, the resulting sequence of pseudo-random values $x(r, e_c)$ follows a raster scan order over a 16×16 pixel grid, thus enabling raster scan ordering of the blocks of 8×8 pixels as discussed previously.

As part of the film grain block creation step 104, in the illustrated embodiment, computation of the random offsets is followed by scaling of the 64 film grain values extracted from the database as follows:

```
scale_factor = (BIT₀(x(r, e_c)) == 0) ? comp_model_value[ c ][ s ][ 0 ] :
                                        -comp_model_value[ c ][ s ][ 0 ]
scale_factor >>= (c == 0) ? 0 : 1
for( k = 0; k<8; k++)
   for( l = 0; l<8; l++) {
      g = scale_factor * database[ h ][ v ][ k + k_offset ][ l + l_offset ]
      film_grain_block[ k ][ l ] = (((g + 2^(log2_scale_factor − 1)) >>
         log2_scale_factor ) + 32) >> 6
   }
``` where h is equal to comp_model_value[c][s][1]−2, v is equal to comp_model_value[c][s][2]−2, the factor 6 scales the film grain values provided in Annex A, Appendix A.3, and $BIT_0$ denotes the LSB.

Deblocking occurs during step 108 whereby a deblocking filter (not shown) is applied between adjacent film grain blocks to ensure the seamless formation of film grain patterns. In the illustrative embodiment, the deblocking filter applies only to the vertical edges between adjacent blocks. Assuming film grain blocks are simulated in raster scan order and that the left-most pixels of current_fg_block are adjacent to the right-most pixels of previous_fg_block, the deblocking filter shall be performed by means of a 3-tap filter as follows:

```
for (k = 0; k<8; k++){
   l1 = previous_fg_block[ 6 ][ k ]
   l0 = previous_fg_block[ 7 ][ k ]
   r0 = current_fg_block[ 0 ][ k ]
   r1 = current_fg_block[ 1 ][ k ]
   current_fg_block[ 0 ][ k ] = (l0 + (r0 << 1) + r1 + 2) >> 2
   previous_fg_block[ 7 ][ k ] = (l1 + (l0 << 1) + r0 + 2) >> 2
}
```

At the end of the film grain simulation process, a deblocked film grain block undergoes blending with a corresponding decoded picture block via a blending block 110 and the result is clipped to [0, 255] prior to display:

```
for( k = 0; k<8; k++)
   for( l = 0; l<8; l++)
display_picture[ c ][ m + k ][ n + l ] = Clip(0, 255,
                     decoded_picture[ c ][ m + k ][ n + l ] +
                     fg_block[ k ][ l ])
``` where (m,n) are the top-left coordinates of the block, decoded_picture[c][m+k][n+l] is the decoded pixel value at coordinates (m+k, n+l) of color component c and display_picture[c][m+k][n+l] is the video output at the same coordinates.

A switching element 111 controls the passage of the deblocked film grain block to the block 110 under the control of a control element 112. The control element 112 controls the switching element responsive to whether the SEI message parameter film_grain_characteristics_cancel_flag equals unity or the frame range specified by the parameter film_grain_characteristics_repetition_period has been exceeded which dictate whether film grain simulation should occur as discussed above.

Although shown separately from the set top box 200, the overall process comprising steps 100, 103, 104, and 108, as well as the elements 101, 102 105, 106, 109, 111 and 112 could easily exist within the set-top box. The same would be true with regard to the DVD player (not shown) reproducing the content on the DVD 12.

Annex A

Accomplishing a bit-accurate representation of the film grain pattern database 105 can occur either by storing a pre-computed list of values or by computing the values through an initialization process.

Database Creation Process

Bit-accurate creation of the database 105 can occur by providing: (1) a LUT of Gaussian random numbers; (2) a uniform pseudo-random number generator, such as generator 106, an integer transform; and by performing a sequence of operations described hereinafter. Creation of a 64×64 film grain pattern with horizontal cut frequency h+2 and vertical cut frequency v+2, yields a database denoted as database[h][v]. The database creation process requires the creation of all possible patterns in the database[h][v], where h and v are in the range of 0 to 12.

To form an individual 64×64 block image, up to 4,096 values are read from a LUT of Gaussian random numbers. The LUT of Gaussian random numbers, provided in Appendix A.3, is composed of 2,048 values stored in 2's complement form and ranging from −127 to 127. The uniform Pseudo-Random Number Generator (PRNG) defined in Section 2 is used to randomly access the LUT of Gaussian random numbers.

In an initialization step, the values of the 64×64 block image shall be set to zero and the seed of the PRNG shall be initialized as follows:

$$e_{h,v} = \text{Seed\_LUT}[h + v*13]$$

(A-1)

Creation of the 64×64 block image occurs as follows:

```
f_h = ((h+3) << 2) − 1
f_v = ((v+3) << 2) − 1
for( l = 0, r = 0; l<=f_v; l++)
   for( k = 0; k<= f_h; k+=4) {
B[ k ][ l ] = Gaussian_LUT[ x(r, e_{h,v}) % 2,048 ]
B[ k + 1 ][ l ] = Gaussian_LUT[ (x(r, e_{h,v}) + 1) % 2,048 ]      (A-2)
B[ k + 2 ][ l ] = Gaussian_LUT[ (x(r, e_{h,v}) + 2) % 2,048 ]
B[ k + 3 ][ l ] = Gaussian_LUT[ (x(r, e_{h,v}) + 3) % 2,048 ]
r++
   }
B[ 0 ][ 0 ] = 0
``` where $x(r, e_{h,v})$ is the pseudo-random value created at iteration r of the polynomial x initialized at seed $e_{h,v}$.

Computation of a 64×64 Inverse Integer Transform

Inverse transformation of the 64×64 matrix of coefficients will yield the film grain pattern database[h][v]. Computation of the inverse transform occurs as follows:

$$\text{database}[h][v] = (((R_{64}^T \times B + 128) >> 8) \times R_{64} + 128) >> 8$$

Deblocking of Horizontal 8×8 Block Edges

The final step in the creation process of a 64×64 film grain pattern comprises the deblocking of horizontal 8×8 block edges. Deblocking is performed by attenuation of pixel values according to the following equation:

```
for(l = 0; l<64;l+=8) {
   for(k = 0; k<64; k++) {
      database[ h ][ v ][ k ][ l ] = (database[ h ][ v ][ k ][ l ] *
         deblock_factor[ v ] ) >> 7
      database[ h ][ v ][ k ][ l + 7 ] = (database[ h ][ v ][ k ][ l + 7 ] *
         deblock_factor[ v ] ) >> 7
   }
}
``` where deblock_factor[v] is defined for a preferred embodiment as:
deblock_factor[v]={66, 71, 77, 84, 90, 96, 103, 109, 116, 122, 128, 128, 128}

The foregoing describes a technique for simulating film grain in an image, and more particularly for simulating film grain in an image for playback by a media device.

APPENDIX A

-Gaussian_LUT[2048] = {

0xF5, 0x0B, 0x67, 0xF5, 0x29, 0xDE, 0x0C, 0x3B, 0x4D, 0x61, 0xAA, 0x03, 0x41, 0xB2, 0x2D, 0x37,

0xCE, 0x15, 0x0D, 0xF6, 0xEC, 0xEE, 0x21, 0x81, 0x10, 0xFB, 0x97, 0x12, 0x13, 0x46, 0x2F, 0xF6,

0xDA, 0x2A, 0xFE, 0x4A, 0xBD, 0x34, 0xA6, 0x21, 0xD2, 0x14, 0xFE, 0xC9, 0x31, 0x00, 0xC7, 0xD7,

0x00, 0x78, 0x81, 0x95, 0xD0, 0x09, 0x0E, 0x7F, 0x7A, 0x6C, 0x33, 0x7F, 0x01, 0x06, 0x71, 0x13,

0x1D, 0x0C, 0x4C, 0x70, 0x51, 0xC3, 0x81, 0x6F, 0xCD, 0xE3, 0x02, 0xCF, 0xE9, 0x3A, 0xE4, 0xB7,

0x0B, 0x70, 0x42, 0x4E, 0xFE, 0x8E, 0xA9, 0xFB, 0xFB, 0x28, 0x3A, 0xB0, 0x31, 0xE6, 0xE2, 0xDE,

0x97, 0x32, 0x10, 0xE8, 0xDD, 0xF3, 0xF2, 0x81, 0xC9, 0xEA, 0xC9, 0x81, 0x90, 0x04, 0xE7, 0xB8,

0x7F, 0x7F, 0xFE, 0x29, 0x57, 0xBF, 0xF1, 0x36, 0x12, 0x5A, 0xB0, 0xBF, 0xC0, 0x23, 0xFA, 0xCA,

0x62, 0xFA, 0x58, 0x7D, 0xE6, 0x5B, 0x00, 0x3F, 0x3B, 0xF2, 0xE9, 0x70, 0xE0, 0x74, 0x0D, 0x19,

0x33, 0xF0, 0x6B, 0xF9, 0x34, 0x26, 0xDE, 0x10, 0xFA, 0x04, 0xA5, 0x06, 0x3E, 0x3E, 0xF1, 0x26,

0xDC, 0x12, 0x36, 0x11, 0xCD, 0x27, 0x21, 0xDB, 0x7D, 0xDA, 0x8A, 0x10, 0xE2, 0x00, 0x12, 0x62,

0x3C, 0x64, 0xF4, 0xB8, 0xEF, 0xCD, 0x62, 0x02, 0x02, 0x3B, 0x21, 0xFD, 0xFE, 0x09, 0xD7, 0x97,

0xDB, 0x0D, 0x7F, 0x0F, 0x81, 0xE1, 0xAA, 0xD9, 0xC9, 0x2D, 0xD7, 0x4B, 0x16, 0xEE, 0xEA, 0xBA,

0x4A, 0xCB, 0xFF, 0x20, 0xD3, 0x11, 0xA4, 0x3B, 0xC0, 0xBE, 0x37, 0x9B, 0xE4, 0xA9, 0xDE, 0xA4,

0x43, 0x05, 0xB7, 0xC3, 0x5C, 0xD6, 0x0D, 0xE7, 0xDB, 0x82, 0xF0, 0x0F, 0x81, 0x3F, 0x22, 0x1F,

0x5D, 0x10, 0xCD, 0xC6, 0x47, 0x4C, 0x50, 0x7F, 0x7F, 0x3C, 0x20, 0x97, 0xA4, 0x00, 0x00, 0x4B,

0xBB, 0x47, 0x7F, 0xED, 0x91, 0x1D, 0x17, 0x0E, 0x02, 0x26, 0x5B, 0x05, 0x29, 0x01, 0xFB, 0x26,

0x0F, 0x71, 0xE3, 0xDB, 0x32, 0x2B, 0x6A, 0x1A, 0x77, 0x06, 0xB1, 0x19, 0xBC, 0xEC, 0x5C, 0xF6,

0xFF, 0x12, 0x29, 0xCE, 0x4F, 0x81, 0xD5, 0x7F, 0x11, 0x0A, 0xEB, 0x1F, 0xCD, 0x1B, 0xA8, 0xA6,

0xD9, 0xED, 0xF7, 0x18, 0x8B, 0x47, 0xE8, 0xD5, 0x01, 0x0B, 0x55, 0x96, 0x26, 0xDF, 0x81, 0x2E,

0x32, 0xE8, 0xEB, 0x2D, 0x00, 0x0F, 0xDD, 0xBC, 0xFF, 0xB7, 0x18, 0xFA, 0x00, 0x1C, 0xFE, 0x2D,

0x20, 0xE0, 0x75, 0xD3, 0x4F, 0xE9, 0xEF, 0x94, 0xF6, 0xBA, 0x58, 0xD1, 0x17, 0xA5, 0x77, 0xDB,

0x31, 0x81, 0x3A, 0x20, 0xAF, 0xF6, 0xF0, 0xFA, 0x2D, 0x81, 0xF1, 0x59, 0x7F, 0x11, 0x62, 0xD9,

0xDF, 0x24, 0x2A, 0xD9, 0xE1, 0xEC, 0x68, 0xED, 0x12, 0x13, 0xC5, 0xF7, 0x1E, 0x00, 0x81, 0x21,

0x7F, 0xAC, 0x4B, 0x17, 0xD8, 0xD0, 0x81, 0x96, 0xF2, 0x2C, 0xB6, 0x01, 0x1D, 0xED, 0x28, 0xBC,

0xD9, 0x0C, 0x7F, 0xFD, 0x05, 0x14, 0xB8, 0xC6, 0x81, 0xFE, 0xFD, 0xCB, 0xFB, 0x8A, 0x5C, 0x77,

0xB0, 0xCF, 0x00, 0x13, 0xD3, 0x42, 0x4D, 0xF4, 0xEB, 0x81, 0x23, 0xD8, 0x37, 0x76, 0xFC, 0x8D,

0xEA, 0x44, 0xF2, 0xA6, 0x18, 0xAE, 0xD5, 0x81, 0x6B, 0xE7, 0xDB, 0x27, 0xFA, 0xFA, 0xAE, 0x05,

0xA9, 0x2B, 0xDE, 0x08, 0x81, 0x26, 0x45, 0x31, 0xC1, 0x49, 0xD0, 0x6C, 0xE6, 0xA8, 0xD1, 0xD9,

0x2C, 0x31, 0xFD, 0x3B, 0xD7, 0x50, 0x08, 0x81, 0xF7, 0xC8, 0xCF, 0x7C, 0xBF, 0x2F, 0x23, 0x75,

0x0F, 0xF5, 0xA0, 0x6D, 0x5E, 0xF0, 0xC9, 0x45, 0x07, 0xF3, 0xFC, 0x31, 0x25, 0xD4, 0x78, 0xE2,

0xB4, 0x28, 0xD3, 0x05, 0x03, 0x44, 0x11, 0xB2, 0x01, 0xB1, 0x05, 0x7F, 0x2A, 0x1A, 0x7F, 0x81,

0x1B, 0xC9, 0xE6, 0x36, 0x6F, 0x2F, 0x6A, 0xFF, 0xB4, 0xFF, 0x34, 0xF8, 0xEA, 0xD6, 0x7A, 0x6C,

0x7F, 0x65, 0x43, 0x2E, 0x05, 0x01, 0x7B, 0xF4, 0xCA, 0xDF, 0xCF, 0x59, 0x41, 0x98, 0xFB, 0x5E,

0xCC, 0x3E, 0x2C, 0x1D, 0x2E, 0x12, 0xDE, 0x0E, 0x28, 0x2E, 0x9F, 0xE8, 0x5E, 0xB5, 0x7F, 0x8E,

0x7F, 0xBD, 0x01, 0xF0, 0x32, 0xA1, 0x2F, 0x0B, 0x22, 0xD4, 0xB6, 0x59, 0x95, 0xF7, 0xC7, 0xE3,

0x93, 0xE8, 0x7F, 0xC4, 0xF3, 0x4C, 0xD4, 0x10, 0x12, 0x53, 0xE9, 0x09, 0x7F, 0xBE, 0x35, 0x03,

0x19, 0x0D, 0x6F, 0x2A, 0x90, 0xEA, 0x0A, 0xE8, 0x53, 0x42, 0xF3, 0x4B, 0x85, 0x3A, 0x7F, 0xF5,

0x63, 0xED, 0x3F, 0xDA, 0x35, 0x08, 0x07, 0x3C, 0xC9, 0x02, 0xC8, 0x71, 0x98, 0xC6, 0x03, 0xF7,

0xD2, 0x49, 0x55, 0xC9, 0xDE, 0x0C, 0x76, 0x1B, 0x5D, 0xB9, 0x0C, 0x9D, 0xB9, 0xEC, 0x1D, 0x47,

0xA2, 0x12, 0xCB, 0x40, 0xF4, 0xC1, 0xE8, 0x41, 0x48, 0xF7, 0x7F, 0x00, 0x81, 0x67, 0xEC, 0xB7,

0x91, 0x9A, 0xFA, 0x1C, 0xD7, 0xEB, 0xC5, 0xE4, 0xE7, 0x13, 0xFC, 0xCE, 0x5E, 0xC6, 0xA2, 0xDC,

0x22, 0x13, 0xBC, 0x7F, 0xEE, 0x81, 0xEA, 0x89, 0xCC, 0x24, 0x4A, 0x81, 0xFF, 0xF5, 0x8A, 0xCB,

0xE5, 0x26, 0x44, 0x11, 0x10, 0x8E, 0x58, 0x3E, 0x18, 0x24, 0xEA, 0x31, 0x9C, 0xE1, 0xF8, 0xA1,

0xCB, 0x05, 0x5C, 0xE9, 0xD0, 0xF8, 0x32, 0x03, 0xB6, 0xA7, 0xF6, 0xDA, 0x7F, 0xAA, 0xEA, 0x13,

0x14, 0x71, 0x4B, 0x33, 0xE1, 0x5C, 0xC2, 0x06, 0xF5, 0x2E, 0x24, 0x65, 0xD5, 0xF0, 0xCC, 0xF9,

0xDB, 0xB4, 0xE1, 0xEB, 0x3E, 0x1E, 0x3E, 0x14, 0x81, 0x1E, 0x3F, 0x24, 0x66, 0xAC, 0xF7, 0x4C,

0x4F, 0x3A, 0xB2, 0xF9, 0x23, 0x08, 0x50, 0xE8, 0xF7, 0x03, 0xEF, 0x47, 0x7F, 0x52, 0xAA, 0x37,

0x12, 0x89, 0x85, 0x24, 0x0A, 0x7F, 0x38, 0xC9, 0x70, 0x0D, 0x19, 0x20, 0xF3, 0xD1, 0x15, 0xF3,

0x04, 0x39, 0x1A, 0x18, 0x19, 0xF6, 0xDC, 0x25, 0xA4, 0x4D, 0x50, 0x09, 0x32, 0x0D, 0x42, 0xF3,

0x00, 0x20, 0x2C, 0xB5, 0x20, 0xDA, 0xEA, 0xCF, 0x81, 0xE5, 0x1F, 0xF8, 0x23, 0x0D, 0x46, 0x0D,

0x38, 0x0B, 0xCC, 0xAB, 0x35, 0xD4, 0xDE, 0x01, 0x7F, 0x0B, 0xBE, 0xD4, 0x2E, 0x8D, 0x02, 0x0A,

0x38, 0xDE, 0x76, 0xEE, 0xC3, 0x34, 0xC6, 0x81, 0xD0, 0xEA, 0x03, 0xFB, 0x10, 0xAF, 0xFB, 0x7F,

0x18, 0x4E, 0x42, 0x3F, 0xE7, 0x0D, 0xC0, 0xDB, 0x81, 0xE4, 0x15, 0xC2, 0x41, 0xCC, 0xD7, 0x6C,

0xC2, 0x0E, 0xEB, 0x0C, 0x1D, 0xC1, 0x14, 0x1B, 0x5F, 0xD4, 0xC6, 0x8C, 0xF7, 0x4F, 0xD0, 0x16,

0xD5, 0xF0, 0x2E, 0xD1, 0x88, 0xDD, 0xE4, 0xCC, 0xD4, 0x1D, 0x7F, 0xF4, 0x30, 0xF8, 0x81, 0x4A,

0xE5, 0xEA, 0x58, 0x3B, 0x0A, 0xA2, 0x50, 0xC5, 0x3A, 0x3C, 0xE7, 0x28, 0xA5, 0xFE, 0xEB, 0xC6,

0xD4, 0xC5, 0xEA, 0xCB, 0x46, 0xE3, 0x42, 0xE1, 0xEA, 0x0E, 0xEF, 0xBE, 0xE8, 0xE4, 0xC3, 0x2F,

0x25, 0x10, 0x0F, 0xDB, 0xE9, 0xF6, 0x08, 0xE6, 0xED, 0x3A, 0x2C, 0xD0, 0xD2, 0xFD, 0xEB, 0xAF,

0x1D, 0xBD, 0x81, 0x4A, 0x65, 0x04, 0xEF, 0x61, 0x22, 0xBF, 0x29, 0xCD, 0x07, 0xC5, 0x17, 0xC7,

0xEE, 0xE8, 0x8A, 0xB8, 0x5A, 0x0E, 0xF1, 0x4E, 0xE0, 0xB2, 0x81, 0xDD, 0x29, 0x4C, 0xAD, 0x01,

0x37, 0x16, 0xB6, 0x7F, 0xF0, 0xEB, 0x0C, 0x1E, 0x37, 0x8F, 0x81, 0x59, 0x36, 0x3D, 0x0C, 0x36,

0xF3, 0x90, 0xF2, 0x1F, 0x30, 0xBE, 0xF0, 0x5A, 0xF7, 0x00, 0x15, 0x45, 0xBA, 0x62, 0xED, 0x90,

0x41, 0xA6, 0xF7, 0xF8, 0xB9, 0x7F, 0x32, 0xB0, 0xD0, 0x18, 0x3C, 0xC4, 0x92, 0x06, 0xD8, 0x7F,

0x57, 0xBF, 0x6B, 0x81, 0xFB, 0x23, 0xF2, 0x29, 0xCF, 0x0D, 0x0D, 0x49, 0x9C, 0xE5, 0x4C, 0x7F,

0xF9, 0x9C, 0x58, 0x25, 0x79, 0x58, 0x83, 0xC5, 0x0D, 0xA3, 0x8D, 0x14, 0xBE, 0xA9, 0xA2, 0x89,

0x2B, 0xE4, 0xE2, 0x11, 0x04, 0xCC, 0xC4, 0x14, 0xD5, 0x0B, 0xB3, 0xC5, 0x0C, 0x1C, 0x02, 0x06,

0xB8, 0x26, 0xC5, 0xF5, 0x6C, 0xCB, 0x28, 0x42, 0xF4, 0x81, 0x81, 0xD0, 0x17, 0x1D, 0x2E, 0x23,

0x5B, 0x22, 0xE0, 0x73, 0xCE, 0xDF, 0xCD, 0x5B, 0x07, 0xAD, 0x48, 0xE7, 0x99, 0x18, 0xF6, 0x4C,

0x54, 0x05, 0x43, 0xB0, 0xF3, 0xEF, 0xE0, 0xD0, 0x13, 0x32, 0x19, 0x09, 0x3E, 0x99, 0xF3, 0x24,

0x7F, 0x71, 0x60, 0x22, 0x00, 0xE0, 0xC9, 0x7F, 0x85, 0xE0, 0x3D, 0xF9, 0x77, 0xE0, 0x81, 0xCC,

0xD6, 0x3F, 0x02, 0xFB, 0xE7, 0x46, 0xC7, 0xE0, 0xD5, 0xD5, 0x21, 0xC8, 0x81, 0x7F, 0x19, 0xDE,

0xF6, 0x10, 0xAF, 0x1D, 0xC7, 0x28, 0x81, 0x81, 0x14, 0xD1, 0xF6, 0xDD, 0xC1, 0xCD, 0xE0, 0xAF,

0x4E, 0xB4, 0xB7, 0x08, 0x1A, 0xB8, 0xF8, 0xB6, 0xAB, 0xAB, 0xC7, 0x19, 0x4E, 0xF7, 0xA0, 0x23,

0xBF, 0x08, 0xC6, 0x0E, 0x01, 0xD7, 0x20, 0xA9, 0xD4, 0x11, 0xFE, 0xF7, 0x3A, 0x27, 0x0B, 0x94,

0xD9, 0x17, 0x21, 0x11, 0xE4, 0x02, 0x33, 0x93, 0xFC, 0x64, 0x01, 0x41, 0x16, 0x00, 0x7F, 0x3D,

0x2D, 0x19, 0xE1, 0x06, 0x09, 0xFA, 0xD0, 0x63, 0x10, 0x2B, 0xFF, 0xD8, 0x20, 0xDA, 0xCC, 0x0A,

0x93, 0xEE, 0x38, 0x81, 0x44, 0x1A, 0x33, 0x5C, 0x27, 0x3D, 0xCD, 0x2C, 0xDA, 0x0D, 0x54, 0x79,

0x1B, 0x42, 0x2D, 0x92, 0xAE, 0xFD, 0x1E, 0x24, 0x12, 0xDC, 0x3A, 0x47, 0x27, 0xB3, 0xD1, 0x3A,

0xB2, 0x07, 0xC2, 0xDD, 0xF3, 0x3C, 0x29, 0x81, 0x47, 0xFC, 0x17, 0xCA, 0x33, 0x81, 0x43, 0xFC,

0xD7, 0x1D, 0xC2, 0x3B, 0xFE, 0xFF, 0xEE, 0xD3, 0xA4, 0xB0, 0xA0, 0xF2, 0xCB, 0xF6, 0xF5, 0xB3,

0x0D, 0x01, 0x07, 0xBE, 0x81, 0x7F, 0xE5, 0x1A, 0xF3, 0x11, 0xF4, 0xE6, 0x01, 0x09, 0xD2, 0xE0,

0xF1, 0x1B, 0xE2, 0xC5, 0x3A, 0x4C, 0x88, 0x1B, 0x27, 0xCA, 0xC2, 0xE2, 0xEC, 0xDC, 0xE1, 0xFA,

0x81, 0xE8, 0xC4, 0x46, 0x81, 0x70, 0x81, 0x7F, 0x57, 0xF9, 0x73, 0x6D, 0x35, 0x56, 0x81, 0x02,

0x0F, 0x16, 0x4A, 0x97, 0xCE, 0x03, 0x49, 0xAF, 0x91, 0xB6, 0x41, 0x51, 0x18, 0x35, 0x7F, 0xD4,

0xCE, 0x9A, 0xD7, 0xBF, 0xE4, 0x4F, 0xBE, 0x40, 0xDF, 0xE2, 0xF9, 0x7F, 0x00, 0xF4, 0xCD, 0x42,

0xF2, 0x05, 0xA4, 0x1C, 0xDD, 0xF9, 0xA6, 0xC7, 0xFD, 0x24, 0x2A, 0x2C, 0xE1, 0xBB, 0xFA, 0x24,

0x26, 0xCE, 0x2A, 0xAF, 0x3A, 0x05, 0x7F, 0x0C, 0x38, 0x42, 0x2D, 0x3A, 0xD6, 0xD6, 0x28, 0xF1,

0x89, 0x18, 0x03, 0xF5, 0x12, 0xF4, 0x32, 0x1C, 0x03, 0x37, 0xD0, 0xF5, 0x00, 0x02, 0x60, 0xEE,

0x1D, 0x29, 0x0D, 0x2A, 0x4E, 0xD4, 0x37, 0x95, 0xD6, 0xED, 0x7F, 0x0F, 0xF6, 0xEE, 0xAF, 0x53,

0xDB, 0x4C, 0x93, 0x0F, 0x40, 0xCF, 0x2B, 0x0B, 0x0D, 0x1A, 0x1B, 0x3C, 0x39, 0x1E, 0x1A, 0x6A,

0xEE, 0x37, 0x0C, 0x61, 0x04, 0xF9, 0xC3, 0x9A, 0x5E, 0x6B, 0xD5, 0x34, 0x1A, 0xD1, 0xF7, 0x69,

0xCB, 0x2E, 0x58, 0x67, 0xDF, 0x26, 0xDE, 0x37, 0x32, 0x46, 0xA2, 0xDE, 0xA9, 0x96, 0xEE, 0xE1,

0x09, 0xED, 0x4E, 0xF2, 0x4C, 0x05, 0xED, 0x95, 0x55, 0x14, 0xD3, 0xD9, 0xD7, 0x08, 0xE4, 0x4A,

0x2F, 0xB5, 0x3C, 0x81, 0x78, 0x91, 0xC7, 0xE1, 0x29, 0x07, 0x4F, 0x4B, 0x42, 0x38, 0x28, 0xE7,

0x1F, 0x25, 0xD2, 0xDC, 0x2B, 0xB7, 0xDC, 0x3E, 0x7F, 0xBB, 0xCD, 0x59, 0xDF, 0xC4, 0x3B, 0xC9,

0x2B, 0x0E, 0x04, 0xBE, 0x0D, 0xA5, 0x3F, 0x1C, 0xDA, 0xFD, 0x52, 0xFE, 0xDA, 0xAB, 0xAB, 0x39,

0x23, 0xBB, 0xC4, 0x1C, 0xDC, 0xA1, 0xB2, 0x04, 0x1E, 0xFC, 0xE0, 0xB1, 0xEB, 0xF7, 0xB4, 0x2D,

0x07, 0xA3, 0xB9, 0x41, 0x09, 0xCF, 0x7F, 0xBB, 0x19, 0xF5, 0xD9, 0x8E, 0x3E, 0x81, 0x9C, 0x04,

0xE1, 0x6E, 0x16, 0xC5, 0x40, 0x9C, 0x1A, 0xD6, 0x15, 0xC6, 0xE5, 0xB7, 0x02, 0xA3, 0x05, 0x7E,

0x05, 0x4B, 0xA9, 0xF7, 0xD5, 0x9C, 0x7F, 0x01, 0x7C, 0x5B, 0xC1, 0x33, 0x38, 0x03, 0x50, 0x81,

0x7F, 0x4F, 0x7F, 0xE3, 0x1D, 0x74, 0xB6, 0xEF, 0xC7, 0x69, 0x30, 0x2D, 0x18, 0xB9, 0x30, 0xDA,

0x95, 0x1F, 0xDF, 0x03, 0xF5, 0x28, 0x81, 0x33, 0x98, 0xD5, 0xDC, 0x33, 0x01, 0x2E, 0x56, 0xF7,

0x4C, 0x1A, 0xD8, 0xE8, 0x5A, 0x56, 0xC9, 0x4A, 0x0A, 0x21, 0x4D, 0x3A, 0x7F, 0x7E, 0xFA, 0xB8,

0x31, 0xE0, 0x96, 0xDE, 0x25, 0x38, 0x34, 0xF0, 0xFC, 0x53, 0x34, 0x95, 0x35, 0x84, 0x1C, 0x16,

0x37, 0xD5, 0xA9, 0xF0, 0xFA, 0x2F, 0x17, 0xF7, 0x00, 0xF4, 0x6E, 0x4A, 0x1B, 0xCC, 0xDB, 0xDF,

0x26, 0x1E, 0x42, 0x27, 0x26, 0xC1, 0x25, 0x03, 0x15, 0xE1, 0xCE, 0xE5, 0x35, 0xDA, 0xA9, 0x14,

0x33, 0x73, 0x12, 0xAF, 0xBB, 0x00, 0xF2, 0xD2, 0xD3, 0xFD, 0x7C, 0x10, 0xF3, 0x17, 0xAE, 0xAD,

0xBC, 0xED, 0xC0, 0x81, 0x08, 0x51, 0xD0, 0x3D, 0x06, 0xDC, 0xD3, 0xD6, 0x39, 0xE6, 0x2F, 0x13,

0xAB, 0x2E, 0xF4, 0x28, 0xDC, 0xB5, 0xC4, 0x55, 0xB2, 0x81, 0x0B, 0x32, 0x01, 0xFE, 0x0C, 0x2F,

0x04, 0x12, 0xB2, 0xCA, 0xE5, 0x40, 0xB9, 0x0B, 0x95, 0x13, 0xF0, 0x0B, 0xE2, 0x3F, 0xC9, 0x24,

0x4B, 0xEF, 0x7F, 0xB8, 0xE0, 0xE4, 0x89, 0x68, 0x43, 0x6A, 0x99, 0x97, 0x46, 0x3C, 0x02, 0x17,
0xFE, 0x20, 0xFC, 0xF2, 0xBE, 0xF2, 0xEA, 0xCA, 0x0F, 0xC2, 0x4B, 0x39, 0x92, 0x00, 0x52, 0xE6,
0x15, 0x4B, 0xD9, 0xEF, 0xF5, 0x40, 0xEF, 0x81, 0xCA, 0xBF, 0x1F, 0x5F, 0x74, 0x03, 0x8F, 0xF9,
0x94, 0xC2, 0x61, 0x09, 0x32, 0x07, 0x4A, 0xE5, 0x48, 0x70, 0xDC, 0x91, 0x5E, 0xCE, 0x17, 0xF4,
0xED, 0x37, 0x14, 0x17, 0x5B, 0x5A, 0x16, 0xCF, 0x10, 0xB6, 0x16, 0x09, 0xD0, 0xA0, 0xDB, 0x31,
0xDD, 0x23, 0x81, 0xAB, 0x2A, 0x7F, 0xE9, 0xE8, 0x54, 0x53, 0xDE, 0xDF, 0xF4, 0x6D, 0x66, 0xDA,
0x32, 0xBD, 0x22, 0x13, 0xEA, 0x30, 0xE1, 0x7E, 0x28, 0x18, 0xA4, 0xFD, 0xFD, 0x69, 0x03, 0xC7,
0xEF, 0x07, 0x7F, 0xEF, 0x7C, 0x43, 0x44, 0xC3, 0x1E, 0xDD, 0x35, 0xC8, 0xE9, 0x11, 0x2A, 0xDD,
0xE6, 0xC8, 0xBD, 0xEC, 0xF7, 0xCF, 0x43, 0x0C, 0x40, 0x04, 0x2F, 0x36, 0x7F, 0xB6, 0x2C, 0x59,
0xBF, 0xF3, 0xB3, 0xAF, 0xA5, 0x16, 0x1D, 0x21, 0xD9, 0xAA, 0xDF, 0x60, 0xA5, 0x27, 0x09, 0xC1,
0xFD, 0xF5, 0x7F, 0xCF, 0xDB, 0xC9, 0x17, 0xDE, 0xDD, 0xCB, 0x59, 0xA5, 0x01, 0x31, 0x4C, 0xFB,
0x81, 0x10, 0x2D, 0xFB, 0xB7, 0x00, 0xC8, 0xEE, 0xB8, 0x1C, 0x5C, 0x3B, 0x31, 0x14, 0x11, 0x6E,
0x92, 0x20, 0xAD, 0x2E, 0x2E, 0xF6, 0x22, 0xA9, 0x2B, 0x39, 0x9F, 0x7F, 0xEF, 0x00, 0x00, 0xDA,
0x81, 0xFE, 0x00, 0x3E, 0x5D, 0x00, 0x24, 0xBF, 0xC3, 0xEE, 0x26, 0x81, 0x39, 0x31, 0xF0, 0x7F,
0x58, 0xD6, 0x94, 0xCD, 0xF0, 0x06, 0xDC, 0x44, 0x2E, 0xF2, 0x6A, 0x28, 0x38, 0x06, 0x13, 0x07,
0x02, 0x57, 0xA7, 0xA4, 0xEF, 0xEB, 0xE9, 0x0C, 0x07, 0xFC, 0xB3, 0xA6, 0xFD, 0x07, 0xDE, 0xFC,

0x12, 0x02, 0x91, 0x04, 0xBE, 0xAF, 0x79, 0xED, 0xDF, 0xDB, 0xAC, 0x7F, 0x43, 0x2D, 0x11, 0x2F

};

A.2.2 LUT of PRNG seeds

Seed_LUT[173] =
{
    1, 207848544, 1756511882, 930434649, 763249220, 575194890, 947173707, 1920384370, 447133882, 1339935731, 1377796300, 271174457, 1198069869, 1661621657, 1743986060, 2077926481, 1331742148, 786140364, 1525112071, 1771594297, 1242061040, 192056172, 2018356587, 166385984, 21118553, 1721162627, 993618401, 953874363, 156353104, 1884552607, 712894377, 965972274, 2058965522, 288658836, 1626536144, 1501102010, 301172797, 447403389, 1040582505, 1522100413, 870342432, 1775643800, 1221041362, 1779102756, 1180374639, 852637658, 1542167176, 1149026881, 100447073, 926671075, 1933929005, 542294649, 1011053571, 1671222556, 1429688165, 1891395211, 2055647522, 22995785, 1442532213, 675966795, 1703505481, 2013843651, 1671669678, 1085040259, 430705574, 2130376611, 1261527826, 15976504, 2011754792, 216863804, 2105395052, 1127940, 1783279601, 1602691796, 1505476467, 1408080649, 180336353, 1381547875, 339789689, 965351473, 427101312, 902100963, 744024896, 1284331604, 1241185038, 1426959894, 2000290842, 1266758843, 18789461, 1665712481, 264198500, 1301146210, 1273389250, 794389433, 2049226913, 1879367632, 1300700193, 212009030, 1957319695, 637701834, 482780409, 1365890669, 1376040417, 1512315348, 1024598031, 1844999775, 1933157338, 1643399146, 276675769, 1707241504, 1016480493, 1361917086, 1730782380, 1621217915, 1585942753, 1325639711, 275717433, 1581177009, 509579973, 1040197139, 519836363, 1962657404, 1906334341, 723415919, 1151165652, 1369484037, 915816613, 582076062, 47146038, 182628210, 1964983821, 1885918321, 370125606, 534524292, 2051583970, 1032364471, 1972079688, 2047231194, 563260760, 1594071307, 1354079352, 2002807836, 632717840, 992281895, 1683480361, 1484871997, 103701272, 345400458, 1333607727, 1396534806, 1265043691, 257575830, 1832801323, 207421923, 1878496261, 913255098, 1480038377, 1655631378, 199918889, 1047339733, 584606242, 116703068, 1435852453, 1851149566, 1450020992, 2073300909, 331912080, 66022624, 2137983702, 884423146, 1325171092, 1765065345, 708316132

};

A.2.3 Transformation matrix

```
iDCT64[64][64] = {
{ /* Row 0 */
  32, 32, 32, 32, 32, 32, 32, 32, 32, 32, 32, 32, 32, 32, 32, 32,
  32, 32, 32, 32, 32, 32, 32, 32, 32, 32, 32, 32, 32, 32, 32, 32,
  32, 32, 32, 32, 32, 32, 32, 32, 32, 32, 32, 32, 32, 32, 32, 32,
  32, 32, 32, 32, 32, 32, 32, 32, 32, 32, 32, 32, 32, 32, 32, 32},
{ /* Row 1 */
  45, 45, 45, 45, 44, 44, 43, 42, 41, 40, 39, 38, 37, 36, 34, 33,
  31, 30, 28, 26, 24, 22, 20, 18, 16, 14, 12, 10, 8, 6, 3, 1,
  -1, -3, -6, -8, -10, -12, -14, -16, -18, -20, -22, -24, -26, -28, -30, -31,
  -33, -34, -36, -37, -38, -39, -40, -41, -42, -43, -44, -44, -45, -45, -45, -45},
{ /* Row 2 */
```

45, 45, 44, 43, 41, 39, 36, 34, 30, 27, 23, 19, 15, 11, 7, 2,
-2, -7, -11, -15, -19, -23, -27, -30, -34, -36, -39, -41, -43, -44, -45, -45,
-45, -45, -44, -43, -41, -39, -36, -34, -30, -27, -23, -19, -15, -11, -7, -2,
2, 7, 11, 15, 19, 23, 27, 30, 34, 36, 39, 41, 43, 44, 45, 45},
{ /* Row 3 */
45, 44, 42, 39, 36, 31, 26, 20, 14, 8, 1, -6, -12, -18, -24, -30,
-34, -38, -41, -44, -45, -45, -45, -43, -40, -37, -33, -28, -22, -16, -10, -3,
3, 10, 16, 22, 28, 33, 37, 40, 43, 45, 45, 45, 44, 41, 38, 34,
30, 24, 18, 12, 6, -1, -8, -14, -20, -26, -31, -36, -39, -42, -44, -45},
{ /* Row 4 */
45, 43, 40, 35, 29, 21, 13, 4, -4, -13, -21, -29, -35, -40, -43, -45,
-45, -43, -40, -35, -29, -21, -13, -4, 4, 13, 21, 29, 35, 40, 43, 45,
45, 43, 40, 35, 29, 21, 13, 4, -4, -13, -21, -29, -35, -40, -43, -45,
-45, -43, -40, -35, -29, -21, -13, -4, 4, 13, 21, 29, 35, 40, 43, 45},
{ /* Row 5 */
45, 42, 37, 30, 20, 10, -1, -12, -22, -31, -38, -43, -45, -45, -41, -36,
-28, -18, -8, 3, 14, 24, 33, 39, 44, 45, 44, 40, 34, 26, 16, 6,
-6, -16, -26, -34, -40, -44, -45, -44, -39, -33, -24, -14, -3, 8, 18, 28,
36, 41, 45, 45, 43, 38, 31, 22, 12, 1, -10, -20, -30, -37, -42, -45,
{ /* Row 6 */
45, 41, 34, 23, 11, -2, -15, -27, -36, -43, -45, -44, -39, -30, -19, -7,
7, 19, 30, 39, 44, 45, 43, 36, 27, 15, 2, -11, -23, -34, -41, -45,
-45, -41, -34, -23, -11, 2, 15, 27, 36, 43, 45, 44, 39, 30, 19, 7,
-7, -19, -30, -39, -44, -45, -43, -36, -27, -15, -2, 11, 23, 34, 41, 45},
{ /* Row 7 */
45, 39, 30, 16, 1, -14, -28, -38, -44, -45, -40, -31, -18, -3, 12, 26,
37, 44, 45, 41, 33, 20, 6, -10, -24, -36, -43, -45, -42, -34, -22, -8,
8, 22, 34, 42, 45, 43, 36, 24, 10, -6, -20, -33, -41, -45, -44, -37,
-26, -12, 3, 18, 31, 40, 45, 44, 38, 28, 14, -1, -16, -30, -39, -45},
{ /* Row 8 */
44, 38, 25, 9, -9, -25, -38, -44, -44, -38, -25, -9, 9, 25, 38, 44,
44, 38, 25, 9, -9, -25, -38, -44, -44, -38, -25, -9, 9, 25, 38, 44,
44, 38, 25, 9, -9, -25, -38, -44, -44, -38, -25, -9, 9, 25, 38, 44,
44, 38, 25, 9, -9, -25, -38, -44, -44, -38, -25, -9, 9, 25, 38, 44},
{ /* Row 9 */
44, 36, 20, 1, -18, -34, -44, -45, -37, -22, -3, 16, 33, 43, 45, 38,
24, 6, -14, -31, -42, -45, -39, -26, -8, 12, 30, 41, 45, 40, 28, 10,
-10, -28, -40, -45, -41, -30, -12, 8, 26, 39, 45, 42, 31, 14, -6, -24,
-38, -45, -43, -33, -16, 3, 22, 37, 45, 44, 34, 18, -1, -20, -36, -44},
{ /* Row 10 */
44, 34, 15, -7, -27, -41, -45, -39, -23, -2, 19, 36, 45, 43, 30, 11,
-11, -30, -43, -45, -36, -19, 2, 23, 39, 45, 41, 27, 7, -15, -34, -44,
-44, -34, -15, 7, 27, 41, 45, 39, 23, 2, -19, -36, -45, -43, -30, -11,
11, 30, 43, 45, 36, 19, -2, -23, -39, -45, -41, -27, -7, 15, 34, 44},
{ /* Row 11 */
44, 31, 10, -14, -34, -45, -42, -28, -6, 18, 37, 45, 40, 24, 1, -22,
-39, -45, -38, -20, 3, 26, 41, 45, 36, 16, -8, -30, -43, -44, -33, -12,
12, 33, 44, 43, 30, 8, -16, -36, -45, -41, -26, -3, 20, 38, 45, 39,
22, -1, -24, -40, -45, -37, -18, 6, 28, 42, 45, 34, 14, -10, -31, -44},

```
{ /* Row 12 */
  43,  29,   4, -21, -40, -45, -35, -13,  13,  35,  45,  40,  21,  -4, -29, -43,
 -43, -29,  -4,  21,  40,  45,  35,  13, -13, -35, -45, -40, -21,   4,  29,  43,
  43,  29,   4, -21, -40, -45, -35, -13,  13,  35,  45,  40,  21,  -4, -29, -43,
 -43, -29,  -4,  21,  40,  45,  35,  13, -13, -35, -45, -40, -21,   4,  29,  43},
{ /* Row 13 */
  43,  26,  -1, -28, -44, -42, -24,   3,  30,  44,  41,  22,  -6, -31, -45, -40,
 -20,   8,  33,  45,  39,  18, -10, -34, -45, -38, -16,  12,  36,  45,  37,  14,
 -14, -37, -45, -36, -12,  16,  38,  45,  34,  10, -18, -39, -45, -33,  -8,  20,
  40,  45,  31,   6, -22, -41, -44, -30,  -3,  24,  42,  44,  28,   1, -26, -43},
{ /* Row 14 */
  43,  23,  -7, -34, -45, -36, -11,  19,  41,  44,  27,  -2, -30, -45, -39, -15,
  15,  39,  45,  30,   2, -27, -44, -41, -19,  11,  36,  45,  34,   7, -23, -43,
 -43, -23,   7,  34,  45,  36,  11, -19, -41, -44, -27,   2,  30,  45,  39,  15,
 -15, -39, -45, -30,  -2,  27,  44,  41,  19, -11, -36, -45, -34,  -7,  23,  43},
{ /* Row 15 */
  42,  20, -12, -38, -45, -28,   3,  33,  45,  34,   6, -26, -44, -39, -14,  18,
  41,  43,  22, -10, -37, -45, -30,   1,  31,  45,  36,   8, -24, -44, -40, -16,
  16,  40,  44,  24,  -8, -36, -45, -31,  -1,  30,  45,  37,  10, -22, -43, -41,
 -18,  14,  39,  44,  26,  -6, -34, -45, -33,  -3,  28,  45,  38,  12, -20, -42},
{ /* Row 16 */
  42,  17, -17, -42, -42, -17,  17,  42,  42,  17, -17, -42, -42, -17,  17,  42,
  42,  17, -17, -42, -42, -17,  17,  42,  42,  17, -17, -42, -42, -17,  17,  42,
  42,  17, -17, -42, -42, -17,  17,  42,  42,  17, -17, -42, -42, -17,  17,  42,
  42,  17, -17, -42, -42, -17,  17,  42,  42,  17, -17, -42, -42, -17,  17,  42},
{ /* Row 17 */
  41,  14, -22, -44, -37,  -6,  30,  45,  31,  -3, -36, -45, -24,  12,  40,  42,
  16, -20, -44, -38,  -8,  28,  45,  33,  -1, -34, -45, -26,  10,  39,  43,  18,
 -18, -43, -39, -10,  26,  45,  34,   1, -33, -45, -28,   8,  38,  44,  20, -16,
 -42, -40, -12,  24,  45,  36,   3, -31, -45, -30,   6,  37,  44,  22, -14, -41},
{ /* Row 18 */
  41,  11, -27, -45, -30,   7,  39,  43,  15, -23, -45, -34,   2,  36,  44,  19,
 -19, -44, -36,  -2,  34,  45,  23, -15, -43, -39,  -7,  30,  45,  27, -11, -41,
 -41, -11,  27,  45,  30,  -7, -39, -43, -15,  23,  45,  34,  -2, -36, -44, -19,
  19,  44,  36,   2, -34, -45, -23,  15,  43,  39,   7, -30, -45, -27,  11,  41},
{ /* Row 19 */
  40,   8, -31, -45, -22,  18,  44,  34,  -3, -38, -42, -12,  28,  45,  26, -14,
 -43, -37,  -1,  36,  44,  16, -24, -45, -30,  10,  41,  39,   6, -33, -45, -20,
  20,  45,  33,  -6, -39, -41, -10,  30,  45,  24, -16, -44, -36,   1,  37,  43,
  14, -26, -45, -28,  12,  42,  38,   3, -34, -44, -18,  22,  45,  31,  -8, -40},
{ /* Row 20 */
  40,   4, -35, -43, -13,  29,  45,  21, -21, -45, -29,  13,  43,  35,  -4, -40,
 -40,  -4,  35,  43,  13, -29, -45, -21,  21,  45,  29, -13, -43, -35,   4,  40,
  40,   4, -35, -43, -13,  29,  45,  21, -21, -45, -29,  13,  43,  35,  -4, -40,
 -40,  -4,  35,  43,  13, -29, -45, -21,  21,  45,  29, -13, -43, -35,   4,  40},
{ /* Row 21 */
  39,   1, -38, -40,  -3,  37,  41,   6, -36, -42,  -8,  34,  43,  10, -33, -44,
 -12,  31,  44,  14, -30, -45, -16,  28,  45,  18, -26, -45, -20,  24,  45,  22,
 -22, -45, -24,  20,  45,  26, -18, -45, -28,  16,  45,  30, -14, -44, -31,  12,
```

44, 33, -10, -43, -34, 8, 42, 36, -6, -41, -37, 3, 40, 38, -1, -39},
{ /* Row 22 */
39, -2, -41, -36, 7, 43, 34, -11, -44, -30, 15, 45, 27, -19, -45, -23,
23, 45, 19, -27, -45, -15, 30, 44, 11, -34, -43, -7, 36, 41, 2, -39,
-39, 2, 41, 36, -7, -43, -34, 11, 44, 30, -15, -45, -27, 19, 45, 23,
-23, -45, -19, 27, 45, 15, -30, -44, -11, 34, 43, 7, -36, -41, -2, 39},
{ /* Row 23 */
38, -6, -43, -31, 16, 45, 22, -26, -45, -12, 34, 41, 1, -40, -36, 10,
44, 28, -20, -45, -18, 30, 44, 8, -37, -39, 3, 42, 33, -14, -45, -24,
24, 45, 14, -33, -42, -3, 39, 37, -8, -44, -30, 18, 45, 20, -28, -44,
-10, 36, 40, -1, -41, -34, 12, 45, 26, -22, -45, -16, 31, 43, 6, -38},
{ /* Row 24 */
38, -9, -44, -25, 25, 44, 9, -38, -38, 9, 44, 25, -25, -44, -9, 38,
38, -9, -44, -25, 25, 44, 9, -38, -38, 9, 44, 25, -25, -44, -9, 38,
38, -9, -44, -25, 25, 44, 9, -38, -38, 9, 44, 25, -25, -44, -9, 38,
38, -9, -44, -25, 25, 44, 9, -38, -38, 9, 44, 25, -25, -44, -9, 38},
{ /* Row 25 */
37, -12, -45, -18, 33, 40, -6, -44, -24, 28, 43, 1, -42, -30, 22, 45,
8, -39, -34, 16, 45, 14, -36, -38, 10, 45, 20, -31, -41, 3, 44, 26,
-26, -44, -3, 41, 31, -20, -45, -10, 38, 36, -14, -45, -16, 34, 39, -8,
-45, -22, 30, 42, -1, -43, -28, 24, 44, 6, -40, -33, 18, 45, 12, -37},
{ /* Row 26 */
36, -15, -45, -11, 39, 34, -19, -45, -7, 41, 30, -23, -44, -2, 43, 27,
-27, -43, 2, 44, 23, -30, -41, 7, 45, 19, -34, -39, 11, 45, 15, -36,
-36, 15, 45, 11, -39, -34, 19, 45, 7, -41, -30, 23, 44, 2, -43, -27,
27, 43, -2, -44, -23, 30, 41, -7, -45, -19, 34, 39, -11, -45, -15, 36},
{ /* Row 27 */
36, -18, -45, -3, 43, 24, -31, -39, 12, 45, 10, -40, -30, 26, 42, -6,
-45, -16, 37, 34, -20, -44, -1, 44, 22, -33, -38, 14, 45, 8, -41, -28,
28, 41, -8, -45, -14, 38, 33, -22, -44, 1, 44, 20, -34, -37, 16, 45,
6, -42, -26, 30, 40, -10, -45, -12, 39, 31, -24, -43, 3, 45, 18, -36},
{ /* Row 28 */
35, -21, -43, 4, 45, 13, -40, -29, 29, 40, -13, -45, -4, 43, 21, -35,
-35, 21, 43, -4, -45, -13, 40, 29, -29, -40, 13, 45, 4, -43, -21, 35,
35, -21, -43, 4, 45, 13, -40, -29, 29, 40, -13, -45, -4, 43, 21, -35,
-35, 21, 43, -4, -45, -13, 40, 29, -29, -40, 13, 45, 4, -43, -21, 35},
{ /* Row 29 */
34, -24, -41, 12, 45, 1, -45, -14, 40, 26, -33, -36, 22, 42, -10, -45,
-3, 44, 16, -39, -28, 31, 37, -20, -43, 8, 45, 6, -44, -18, 38, 30,
-30, -38, 18, 44, -6, -45, -8, 43, 20, -37, -31, 28, 39, -16, -44, 3,
45, 10, -42, -22, 36, 33, -26, -40, 14, 45, -1, -45, -12, 41, 24, -34},
{ /* Row 30 */
34, -27, -39, 19, 43, -11, -45, 2, 45, 7, -44, -15, 41, 23, -36, -30,
30, 36, -23, -41, 15, 44, -7, -45, -2, 45, 11, -43, -19, 39, 27, -34,
-34, 27, 39, -19, -43, 11, 45, -2, -45, -7, 44, 15, -41, -23, 36, 30,
-30, -36, 23, 41, -15, -44, 7, 45, 2, -45, -11, 43, 19, -39, -27, 34},
{ /* Row 31 */
33, -30, -36, 26, 38, -22, -40, 18, 42, -14, -44, 10, 45, -6, -45, 1,
45, 3, -45, -8, 44, 12, -43, -16, 41, 20, -39, -24, 37, 28, -34, -31,

```
      31,  34, -28, -37,  24,  39, -20, -41,  16,  43, -12, -44,   8,  45,  -3, -45,
      -1,  45,   6, -45, -10,  44,  14, -42, -18,  40,  22, -38, -26,  36,  30, -33},
{ /* Row 32 */
      32, -32, -32,  32,  32, -32, -32,  32,  32, -32, -32,  32,  32, -32, -32,  32,
      32, -32, -32,  32,  32, -32, -32,  32,  32, -32, -32,  32,  32, -32, -32,  32,
      32, -32, -32,  32,  32, -32, -32,  32,  32, -32, -32,  32,  32, -32, -32,  32,
      32, -32, -32,  32,  32, -32, -32,  32,  32, -32, -32,  32,  32, -32, -32,  32},
{ /* Row 33 */
      31, -34, -28,  37,  24, -39, -20,  41,  16, -43, -12,  44,   8, -45,  -3,  45,
      -1, -45,   6,  45, -10, -44,  14,  42, -18, -40,  22,  38, -26, -36,  30,  33,
     -33, -30,  36,  26, -38, -22,  40,  18, -42, -14,  44,  10, -45,  -6,  45,   1,
     -45,   3,  45,  -8, -44,  12,  43, -16, -41,  20,  39, -24, -37,  28,  34, -31},
{ /* Row 34 */
      30, -36, -23,  41,  15, -44,  -7,  45,  -2, -45,  11,  43, -19, -39,  27,  34,
     -34, -27,  39,  19, -43, -11,  45,   2, -45,   7,  44, -15, -41,  23,  36, -30,
     -30,  36,  23, -41, -15,  44,   7, -45,   2,  45, -11, -43,  19,  39, -27, -34,
      34,  27, -39, -19,  43,  11, -45,  -2,  45,  -7, -44,  15,  41, -23, -36,  30},
{ /* Row 35 */
      30, -38, -18,  44,   6, -45,   8,  43, -20, -37,  31,  28, -39, -16,  44,   3,
     -45,  10,  42, -22, -36,  33,  26, -40, -14,  45,   1, -45,  12,  41, -24, -34,
      34,  24, -41, -12,  45,  -1, -45,  14,  40, -26, -33,  36,  22, -42, -10,  45,
      -3, -44,  16,  39, -28, -31,  37,  20, -43,  -8,  45,  -6, -44,  18,  38, -30},
{ /* Row 36 */
      29, -40, -13,  45,  -4, -43,  21,  35, -35, -21,  43,   4, -45,  13,  40, -29,
     -29,  40,  13, -45,   4,  43, -21, -35,  35,  21, -43,  -4,  45, -13, -40,  29,
      29, -40, -13,  45,  -4, -43,  21,  35, -35, -21,  43,   4, -45,  13,  40, -29,
     -29,  40,  13, -45,   4,  43, -21, -35,  35,  21, -43,  -4,  45, -13, -40,  29},
{ /* Row 37 */
      28, -41,  -8,  45, -14, -38,  33,  22, -44,  -1,  44, -20, -34,  37,  16, -45,
       6,  42, -26, -30,  40,  10, -45,  12,  39, -31, -24,  43,   3, -45,  18,  36,
     -36, -18,  45,  -3, -43,  24,  31, -39, -12,  45, -10, -40,  30,  26, -42,  -6,
      45, -16, -37,  34,  20, -44,   1,  44, -22, -33,  38,  14, -45,   8,  41, -28},
{ /* Row 38 */
      27, -43,  -2,  44, -23, -30,  41,   7, -45,  19,  34, -39, -11,  45, -15, -36,
      36,  15, -45,  11,  39, -34, -19,  45,  -7, -41,  30,  23, -44,   2,  43, -27,
     -27,  43,   2, -44,  23,  30, -41,  -7,  45, -19, -34,  39,  11, -45,  15,  36,
     -36, -15,  45, -11, -39,  34,  19, -45,   7,  41, -30, -23,  44,  -2, -43,  27},
{ /* Row 39 */
      26, -44,   3,  41, -31, -20,  45, -10, -38,  36,  14, -45,  16,  34, -39,  -8,
      45, -22, -30,  42,   1, -43,  28,  24, -44,   6,  40, -33, -18,  45, -12, -37,
      37,  12, -45,  18,  33, -40,  -6,  44, -24, -28,  43,  -1, -42,  30,  22, -45,
       8,  39, -34, -16,  45, -14, -36,  38,  10, -45,  20,  31, -41,  -3,  44, -26},
{ /* Row 40 */
      25, -44,   9,  38, -38,  -9,  44, -25, -25,  44,  -9, -38,  38,   9, -44,  25,
      25, -44,   9,  38, -38,  -9,  44, -25, -25,  44,  -9, -38,  38,   9, -44,  25,
      25, -44,   9,  38, -38,  -9,  44, -25, -25,  44,  -9, -38,  38,   9, -44,  25,
      25, -44,   9,  38, -38,  -9,  44, -25, -25,  44,  -9, -38,  38,   9, -44,  25},
{ /* Row 41 */
      24, -45,  14,  33, -42,   3,  39, -37,  -8,  44, -30, -18,  45, -20, -28,  44,
```

```
   -10, -36,  40,   1, -41,  34,  12, -45,  26,  22, -45,  16,  31, -43,   6,  38,
   -38,  -6,  43, -31, -16,  45, -22, -26,  45, -12, -34,  41,  -1, -40,  36,  10,
   -44,  28,  20, -45,  18,  30, -44,   8,  37, -39,  -3,  42, -33, -14,  45, -24},
{ /* Row 42 */
    23, -45,  19,  27, -45,  15,  30, -44,  11,  34, -43,   7,  36, -41,   2,  39,
   -39,  -2,  41, -36,  -7,  43, -34, -11,  44, -30, -15,  45, -27, -19,  45, -23,
   -23,  45, -19, -27,  45, -15, -30,  44, -11, -34,  43,  -7, -36,  41,  -2, -39,
    39,   2, -41,  36,   7, -43,  34,  11, -44,  30,  15, -45,  27,  19, -45,  23},
{ /* Row 43 */
    22, -45,  24,  20, -45,  26,  18, -45,  28,  16, -45,  30,  14, -44,  31,  12,
   -44,  33,  10, -43,  34,   8, -42,  36,   6, -41,  37,   3, -40,  38,   1, -39,
    39,  -1, -38,  40,  -3, -37,  41,  -6, -36,  42,  -8, -34,  43, -10, -33,  44,
   -12, -31,  44, -14, -30,  45, -16, -28,  45, -18, -26,  45, -20, -24,  45, -22},
{ /* Row 44 */
    21, -45,  29,  13, -43,  35,   4, -40,  40,  -4, -35,  43, -13, -29,  45, -21,
   -21,  45, -29, -13,  43, -35,  -4,  40, -40,   4,  35, -43,  13,  29, -45,  21,
    21, -45,  29,  13, -43,  35,   4, -40,  40,  -4, -35,  43, -13, -29,  45, -21,
   -21,  45, -29, -13,  43, -35,  -4,  40, -40,   4,  35, -43,  13,  29, -45,  21},
{ /* Row 45 */
    20, -45,  33,   6, -39,  41, -10, -30,  45, -24, -16,  44, -36,  -1,  37, -43,
    14,  26, -45,  28,  12, -42,  38,  -3, -34,  44, -18, -22,  45, -31,  -8,  40,
   -40,   8,  31, -45,  22,  18, -44,  34,   3, -38,  42, -12, -28,  45, -26, -14,
    43, -37,   1,  36, -44,  16,  24, -45,  30,  10, -41,  39,  -6, -33,  45, -20},
{ /* Row 46 */
    19, -44,  36,  -2, -34,  45, -23, -15,  43, -39,   7,  30, -45,  27,  11, -41,
    41, -11, -27,  45, -30,  -7,  39, -43,  15,  23, -45,  34,   2, -36,  44, -19,
   -19,  44, -36,   2,  34, -45,  23,  15, -43,  39,  -7, -30,  45, -27, -11,  41,
   -41,  11,  27, -45,  30,   7, -39,  43, -15, -23,  45, -34,  -2,  36, -44,  19},
{ /* Row 47 */
    18, -43,  39, -10, -26,  45, -34,   1,  33, -45,  28,   8, -38,  44, -20, -16,
    42, -40,  12,  24, -45,  36,  -3, -31,  45, -30,  -6,  37, -44,  22,  14, -41,
    41, -14, -22,  44, -37,   6,  30, -45,  31,   3, -36,  45, -24, -12,  40, -42,
    16,  20, -44,  38,  -8, -28,  45, -33,  -1,  34, -45,  26,  10, -39,  43, -18},
{ /* Row 48 */
    17, -42,  42, -17, -17,  42, -42,  17,  17, -42,  42, -17, -17,  42, -42,  17,
    17, -42,  42, -17, -17,  42, -42,  17,  17, -42,  42, -17, -17,  42, -42,  17,
    17, -42,  42, -17, -17,  42, -42,  17,  17, -42,  42, -17, -17,  42, -42,  17,
    17, -42,  42, -17, -17,  42, -42,  17,  17, -42,  42, -17, -17,  42, -42,  17},
{ /* Row 49 */
    16, -40,  44, -24,  -8,  36, -45,  31,  -1, -30,  45, -37,  10,  22, -43,  41,
   -18, -14,  39, -44,  26,   6, -34,  45, -33,   3,  28, -45,  38, -12, -20,  42,
   -42,  20,  12, -38,  45, -28,  -3,  33, -45,  34,  -6, -26,  44, -39,  14,  18,
   -41,  43, -22, -10,  37, -45,  30,   1, -31,  45, -36,   8,  24, -44,  40, -16},
{ /* Row 50 */
    15, -39,  45, -30,   2,  27, -44,  41, -19, -11,  36, -45,  34,  -7, -23,  43,
   -43,  23,   7, -34,  45, -36,  11,  19, -41,  44, -27,  -2,  30, -45,  39, -15,
   -15,  39, -45,  30,  -2, -27,  44, -41,  19,  11, -36,  45, -34,   7,  23, -43,
    43, -23,  -7,  34, -45,  36, -11, -19,  41, -44,  27,   2, -30,  45, -39,  15},
{ /* Row 51 */
```

14, -37, 45, -36, 12, 16, -38, 45, -34, 10, 18, -39, 45, -33, 8, 20,
-40, 45, -31, 6, 22, -41, 44, -30, 3, 24, -42, 44, -28, 1, 26, -43,
43, -26, -1, 28, -44, 42, -24, -3, 30, -44, 41, -22, -6, 31, -45, 40,
-20, -8, 33, -45, 39, -18, -10, 34, -45, 38, -16, -12, 36, -45, 37, -14},
{ /* Row 52 */
13, -35, 45, -40, 21, 4, -29, 43, -43, 29, -4, -21, 40, -45, 35, -13,
-13, 35, -45, 40, -21, -4, 29, -43, 43, -29, 4, 21, -40, 45, -35, 13,
13, -35, 45, -40, 21, 4, -29, 43, -43, 29, -4, -21, 40, -45, 35, -13,
-13, 35, -45, 40, -21, -4, 29, -43, 43, -29, 4, 21, -40, 45, -35, 13},
{ /* Row 53 */
12, -33, 44, -43, 30, -8, -16, 36, -45, 41, -26, 3, 20, -38, 45, -39,
22, 1, -24, 40, -45, 37, -18, -6, 28, -42, 45, -34, 14, 10, -31, 44,
-44, 31, -10, -14, 34, -45, 42, -28, 6, 18, -37, 45, -40, 24, -1, -22,
39, -45, 38, -20, -3, 26, -41, 45, -36, 16, 8, -30, 43, -44, 33, -12},
{ /* Row 54 */
11, -30, 43, -45, 36, -19, -2, 23, -39, 45, -41, 27, -7, -15, 34, -44,
44, -34, 15, 7, -27, 41, -45, 39, -23, 2, 19, -36, 45, -43, 30, -11,
-11, 30, -43, 45, -36, 19, 2, -23, 39, -45, 41, -27, 7, 15, -34, 44,
-44, 34, -15, -7, 27, -41, 45, -39, 23, -2, -19, 36, -45, 43, -30, 11},
{ /* Row 55 */
10, -28, 40, -45, 41, -30, 12, 8, -26, 39, -45, 42, -31, 14, 6, -24,
38, -45, 43, -33, 16, 3, -22, 37, -45, 44, -34, 18, 1, -20, 36, -44,
44, -36, 20, -1, -18, 34, -44, 45, -37, 22, -3, -16, 33, -43, 45, -38,
24, -6, -14, 31, -42, 45, -39, 26, -8, -12, 30, -41, 45, -40, 28, -10},
{ /* Row 56 */
9, -25, 38, -44, 44, -38, 25, -9, -9, 25, -38, 44, -44, 38, -25, 9,
9, -25, 38, -44, 44, -38, 25, -9, -9, 25, -38, 44, -44, 38, -25, 9,
9, -25, 38, -44, 44, -38, 25, -9, -9, 25, -38, 44, -44, 38, -25, 9,
9, -25, 38, -44, 44, -38, 25, -9, -9, 25, -38, 44, -44, 38, -25, 9},
{ /* Row 57 */
8, -22, 34, -42, 45, -43, 36, -24, 10, 6, -20, 33, -41, 45, -44, 37,
-26, 12, 3, -18, 31, -40, 45, -44, 38, -28, 14, 1, -16, 30, -39, 45,
-45, 39, -30, 16, -1, -14, 28, -38, 44, -45, 40, -31, 18, -3, -12, 26,
-37, 44, -45, 41, -33, 20, -6, -10, 24, -36, 43, -45, 42, -34, 22, -8},
{ /* Row 58 */
7, -19, 30, -39, 44, -45, 43, -36, 27, -15, 2, 11, -23, 34, -41, 45,
-45, 41, -34, 23, -11, -2, 15, -27, 36, -43, 45, -44, 39, -30, 19, -7,
-7, 19, -30, 39, -44, 45, -43, 36, -27, 15, -2, -11, 23, -34, 41, -45,
45, -41, 34, -23, 11, 2, -15, 27, -36, 43, -45, 44, -39, 30, -19, 7},
{ /* Row 59 */
6, -16, 26, -34, 40, -44, 45, -44, 39, -33, 24, -14, 3, 8, -18, 28,
-36, 41, -45, 45, -43, 38, -31, 22, -12, 1, 10, -20, 30, -37, 42, -45,
45, -42, 37, -30, 20, -10, -1, 12, -22, 31, -38, 43, -45, 45, -41, 36,
-28, 18, -8, -3, 14, -24, 33, -39, 44, -45, 44, -40, 34, -26, 16, -6},
{ /* Row 60 */
4, -13, 21, -29, 35, -40, 43, -45, 45, -43, 40, -35, 29, -21, 13, -4,
-4, 13, -21, 29, -35, 40, -43, 45, -45, 43, -40, 35, -29, 21, -13, 4,
4, -13, 21, -29, 35, -40, 43, -45, 45, -43, 40, -35, 29, -21, 13, -4,
-4, 13, -21, 29, -35, 40, -43, 45, -45, 43, -40, 35, -29, 21, -13, 4},

```
{ /* Row 61 */
    3, -10,  16, -22,  28, -33,  37, -40,  43, -45,  45, -45,  44, -41,  38, -34,
   30, -24,  18, -12,   6,   1,  -8,  14, -20,  26, -31,  36, -39,  42, -44,  45,
  -45,  44, -42,  39, -36,  31, -26,  20, -14,   8,  -1,  -6,  12, -18,  24, -30,
   34, -38,  41, -44,  45, -45,  45, -43,  40, -37,  33, -28,  22, -16,  10,  -3},
{ /* Row 62 */
    2,  -7,  11, -15,  19, -23,  27, -30,  34, -36,  39, -41,  43, -44,  45, -45,
   45, -45,  44, -43,  41, -39,  36, -34,  30, -27,  23, -19,  15, -11,   7,  -2,
   -2,   7, -11,  15, -19,  23, -27,  30, -34,  36, -39,  41, -43,  44, -45,  45,
  -45,  45, -44,  43, -41,  39, -36,  34, -30,  27, -23,  19, -15,  11,  -7,   2},
{ /* Row 63 */
    1,  -3,   6,  -8,  10, -12,  14, -16,  18, -20,  22, -24,  26, -28,  30, -31,
   33, -34,  36, -37,  38, -39,  40, -41,  42, -43,  44, -44,  45, -45,  45, -45,
   45, -45,  45, -45,  44, -44,  43, -42,  41, -40,  39, -38,  37, -36,  34, -33,
   31, -30,  28, -26,  24, -22,  20, -18,  16, -14,  12, -10,   8,  -6,   3,  -1}
```

The invention claimed is:

1. A method for simulating a film grain block, comprising the steps of:
   establishing at least one parameter at least in part in accordance with an attribute of an image block;
   simulating at least one block of film grain from at least one film grain pattern generated in accordance with the at least one parameter; and
   blending the at least one ʳblock of film grain with the image block, wherein the blending occurs in decode order.

2. The method according to claim 1 wherein the simulating step is preceded by receipt of a supplemental film grain information message accompanying the image block.

3. The method according to claim 1 further including the step of simulating the at least one block of film grain in display order 4. The method according to claim 1 wherein the simulating step further comprises:
   scaling cut frequencies for chroma components of the image block;
   computing an average pixel value for the image block;
   comparing the average pixel value to the block to a corresponding intensity value in a film grain information message accompanying an image block to be blended with the film grain block;
   retrieving a block of film grain from a database of film grain blocks; and
   deblocking vertical edges between adjacent blocks.

5. The method according to claim 4 wherein the cut frequencies for the chroma components are scaled to a 4:2:0 format upon receipt of the at least one parameter in a 4:4:4 chroma format.

6. The method according to claim 4 wherein the step of retrieving a block of film grain further comprises the step of randomly retrieving the block of film grain.

7. The method according to claim 4 wherein the retrieving step further comprises the step of retrieving a block of film grain from a database of pre-computed film grain blocks.

8. The method according to claim 4 further comprising the step of establishing the database of film grain blocks by the steps of:
   specifying a look up table of Gaussian random values;
   randomly accessing the look up table;
   performing an integer inverse transform on values randomly accessed from the look-up table; and
   deblocking horizontal edges of patterns obtained from the integer inverse transform.

9. The method according to claim 1 wherein simulation of film grain does not occur if a film grain message accompanying the image block specifies inhibiting simulation.

10. The method according to claim 9 further comprising the step of inhibiting film grain simulation if the pixel value lies outside all prescribed bands.

11. A method for simulating a film grain block, comprising the steps of:
    establishing at least one parameter at least in part in accordance with an attribute of an image block;
    simulating at least one block of film grain from at least one film grain pattern generated in accordance with the at least one parameter; and
    blending the at least one block of film grain with the image block, wherein the blending occurs in display order.

12. The method according to claim 11 further including the step of simulating the at least one block of film grain in display order.

13. The method according to claim 11 wherein the simulating step further comprises:
    scaling cut frequencies for chroma components of the image block;
    computing an average pixel value for the image block;
    comparing the average pixel value to the block to a corresponding intensity value in a film grain information message accompanying an image block to be blended with the film grain block;
    retrieving a block of film grain from a database of film grain blocks; and
    deblocking vertical edges between adjacent blocks.

14. The method according to claim 13 wherein the cut frequencies for the chroma components are scaled to a 4:2:0 format upon receipt of the at least one parameter in a 4:4:4 chroma format.

15. The method according to claim 13 wherein the step of retrieving a block of film grain further comprises the step of randomly retrieving the block of film grain.

16. The method according to claim 13 wherein the retrieving step further comprises the step of retrieving a block of film grain from a database of pre-computed film grain blocks.

17. The method according to claim 13 further comprising the step of establishing the database of film grain blocks by the steps of:
    specifying a look up table of Gaussian random values;
    randomly accessing the look up table;
    performing an integer inverse transform on values randomly accessed from the look-up table; and
    deblocking horizontal edges of patterns obtained from the integer inverse transform.

18. The method according to claim 11 wherein simulation of film grain does not occur if a film grain message accompanying the image block specifies inhibiting simulation.

19. The method according to claim 11 further comprising the step of inhibiting film grain simulation if the pixel value lies outside all prescribed bands.

20. Apparatus for simulating a film grain block for blending with an image block, comprising:
    means for establishing at least one parameter at least in part in accordance with an attribute of the image block;
    means for simulating at least one block of film grain by generating at least one film grain pattern in accordance with the at least one parameter; and
    means for blending the at least one block of film grain with the image block, wherein the blending occurs in decode order.

21. The apparatus according to claim 20 wherein the means for simulating film grain simulates the at least one block of film grain in decode order.

22. The apparatus according to claim 20 wherein the simulating means further comprise:
    means for scaling cut frequencies for chroma components of the image block;
    means for computing an average pixel value for the image block;
    means for comparing the average pixel value of the block to a corresponding intensity value in a film grain information message accompanying an image block to be blended with the film grain block;
    a database of film grain blocks;
    means for retrieving a block of film grain from the database of film grain blocks; and,
    means deblocking vertical edges between adjunct blocks.

23. The apparatus according to claim 22 wherein scaling means scale the cut frequencies for the chroma components to a 4:2:0 format upon receipt of the at least one parameter in a 4:4:4 chroma format.

24. The apparatus according to claim 22 wherein the means for retrieving a block of film grain randomly retrieves the film grain block.

25. The apparatus according to claim 22 wherein the database contains pre-computed film grain blocks.

26. Apparatus for simulating a film grain block for blending with an image block, comprising:
- means for establishing at least one parameter at least in part in accordance with an attribute of the image block;
- means for simulating at least one block of film grain by generating at least one film grain pattern in accordance with the at least one parameter; and
- means for blending the at least one block of film grain with the image block, wherein the blending occurs in display order.

27. The apparatus according to claim 26 wherein the means for simulating film grain simulates the at least one block of film grain in display order.

28. The apparatus according to claim 26 wherein the simulating means further comprise:
- means for scaling cut frequencies for chroma components of the image block;
- means for computing an average pixel value for the image block;
- means for comparing the average pixel value of the block to a corresponding intensity value in a film grain information message accompanying an image block to be blended with the film grain block;
- a database of film grain blocks;
- means for retrieving a block of film grain from the database of film grain blocks; and,
- means deblocking vertical edges between adjunct blocks.

29. The apparatus according to claim 28 wherein scaling means scale the cut frequencies for the chroma components to a 4:2:0 format upon receipt of the at least one parameter in a 4:4:4 chroma format.

30. The apparatus according to claim 28 wherein the means for retrieving a block of film grain randomly retrieves the film grain block.

31. The apparatus according to claim 28 wherein the database contains pre-computed film grain blocks.

* * * * *